United States Patent
Okahira

(10) Patent No.: US 7,960,470 B2
(45) Date of Patent: Jun. 14, 2011

(54) METHOD FOR PRODUCING POLYMER COMPOSITION AND POLYMER COMPOSITION

(75) Inventor: Tamayo Okahira, Yokohama (JP)

(73) Assignee: The Inctec Inc., Kanagawa-ken (JP)

( * ) Notice: Subject to any disclaimer, the term of this patent is extended or adjusted under 35 U.S.C. 154(b) by 679 days.

(21) Appl. No.: 11/989,904

(22) PCT Filed: Jul. 28, 2006

(86) PCT No.: PCT/JP2006/315038
§ 371 (c)(1),
(2), (4) Date: Feb. 1, 2008

(87) PCT Pub. No.: WO2007/015437
PCT Pub. Date: Feb. 8, 2007

(65) Prior Publication Data
US 2010/0160554 A1    Jun. 24, 2010

(30) Foreign Application Priority Data

Aug. 3, 2005 (JP) .................................. 2005-225660
Dec. 28, 2005 (JP) .................................. 2005-378781

(51) Int. Cl.
C08F 2/44 (2006.01)
C08F 4/34 (2006.01)

(52) U.S. Cl. ................... 524/853; 526/227; 526/228

(58) Field of Classification Search ................. 524/853; 526/227, 228
See application file for complete search history.

(56) References Cited

U.S. PATENT DOCUMENTS

| | | |
|---|---|---|
| 3,997,624 A | 12/1976 | Hudgin |
| 4,647,647 A | 3/1987 | Haubennestel et al. |
| 5,578,687 A | 11/1996 | Sounik et al. |
| 6,124,409 A | 9/2000 | Ng et al. |
| 2003/0008989 A1* | 1/2003 | Gore et al. ................ 526/227 |
| 2006/0217485 A1* | 9/2006 | Ohrbom et al. ............ 524/556 |

FOREIGN PATENT DOCUMENTS

| | | |
|---|---|---|
| CN | 1487042 | 4/2004 |
| JP | 60166318 | 8/1985 |
| JP | 1879529 | 5/1989 |
| JP | 2680594 | 9/1989 |
| JP | 07-330834 A | 12/1995 |
| JP | 2002-341600 A | 11/2002 |
| JP | 2002341600 | 11/2002 |
| JP | 2004-175981 A | 6/2004 |
| JP | 2004175981 | 6/2004 |
| JP | 2006-111710 A | 4/2006 |

OTHER PUBLICATIONS

PCT International Preliminary Report on Patentability; mailed Feb. 14, 2008.
Extended European Search Report dated Jun. 24, 2009 in corresponding foreign application.
Chinese Office Action issued Sep. 19, 2008 in corresponding foreign application, with English Translation.
Chinese Office Action issued in corresponding foreign application onDec. 18, 2009, with English Translation.

* cited by examiner

*Primary Examiner* — Robert D. Harlan
(74) *Attorney, Agent, or Firm* — Harness, Dickey & Pierce, PLC

(57) ABSTRACT

Disclosed are a process for producing a polymer composition having a high solubility in a solvent, and a polymer composition. The process for producing a polymer composition comprises polymerizing a radical polymerizable monomer in a solvent comprising a compound of formula (1) or (2) in the presence of a radical polymerization initiator:

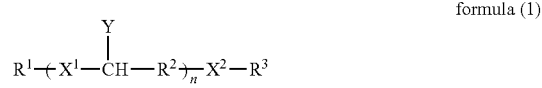

formula (1)

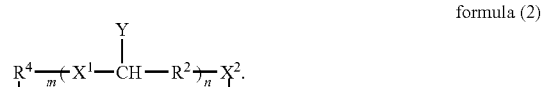

formula (2)

7 Claims, 3 Drawing Sheets

METHOD FOR PRODUCING POLYMER COMPOSITION AND POLYMER COMPOSITION

RELATED APPLICATION

This application is based upon and claims the benefit of priority from the prior Japanese Patent Application No. 225660/2005 and Japanese Patent Application No. 378781/2005 filed with claiming of priority under the Paris Convention, the entire contents of which are incorporated herein by reference.

TECHNICAL FIELD

The present invention relates to a method producing a polymer composition and a polymer composition. More particularly, the first aspect of the present invention provides a method producing a polymer composition having high solubility in solvents, and a polymer composition. The second aspect of the present invention provides a method for producing a polymer composition having excellent compatibility suitable as a constituent of an ink composition.

BACKGROUND ART

First Aspect of the Present Invention

Polymer compositions have hitherto been used in various fields and have hitherto been widely used, for example, as binder resins in ink compositions. Ink compositions generally comprise a pigment, a binder resin, an additive, a solvent and the like.

The binder resin for the ink composition should have satisfactory solubility in a solvent and affinity for pigments and the like from the viewpoint of good preparation and coating work of the ink composition and further should form a coating film having, for example, good durability after drying and curing.

In order to have excellent properties as the ink composition, it is very important to control the compatibility of these constituents. For example, poor compatibility of the binder resin with the solvent sometimes imposes problems such as difficulties of preparing a highly concentrated ink composition, impossibility to efficiently prepare an ink composition, necessity of taking a long time to perform coating work or curing by drying, and difficulties of forming a coating film having satisfactory durability.

Acrylic resins may be mentioned as the binder resin which has hitherto been widely used in the ink composition. The acrylic resin can easily undergo a change, for example, in properties upon a change in the type, composition and molecular weight of an acrylic monomer to be polymerized and thus is suitable as a binder resin for inks.

A radical polymerization reaction is generally used as a method for polymerizing the acrylic monomer to produce a binder resin. In particular, a solution polymerization method, in which the monomer is polymerized in a solvent in the presence of a radical polymerization initiator, has been used on a commercial scale as a method for producing binder resins for solvent-based inks because the resultant resin solution as such can be used.

In preparing an ink composition, a binder resin is dissolved in a solvent. The acrylic resin, which has been preferably used as the binder resin, suffers from a problem of poor solubility, for example, in alkyl esters or polyalkylene glycol alkyl ethers which are common solvents for ink compositions.

To overcome this drawback through an improvement in solubility of the acrylic resin, proposals have been made on a method using acrylic acid glycol monoester or methacrylic acid glycol monoester as an acrylic monomer (for example, Japanese Patent Publication No. 4810/1994), a method using a specific organic silicon compound as a comonomer (Japanese Patent Laid-Open No. 313725/2000), and a technique in which the solubility is improved by lowering the molecular weight of the resin (for example, Japanese Patent No. 2727398).

The above methods have been recognized as a technique for improving the solubility of the acrylic resin. So far as the present inventor knows, however, the utilization of the resin improved in solubility by the above method as the binder for the ink results in many cases unsatisfactory properties of printed matter, for example, unsatisfactory drying properties and durability. Accordingly, there is a demand for further improved solubility of the resin and improved properties of the printed matter.

An ink composition, which is excellent in rubbing/scratch resistance and has high coating film strength, can be produced by using a binder resin having a high glass transition (Tg). The resin having a high Tg value, however, is generally very poor in compatibility with solvents and is very difficult to be dissolved in solvents, particularly solvents for ink compositions.

Thus, polymer compositions having excellent solubility in solvents, particularly resin compositions having a high Tg value, could not have been produced without difficulties. Accordingly, ink compositions, which can form a coating film having excellent durability, using the polymer composition having excellent solubility as the binder resin could not have also been produced.

Second Aspect of the Invention

Polymer compositions have hitherto been used in various fields and have hitherto been widely used, for example, as binder resins in ink compositions.

Ink compositions generally comprise a pigment, a binder resin, and a solvent as indispensable ingredients and optionally assistants, for example, pigment dispersants. In order to have excellent properties as the ink composition, it is very important to control the compatibility and affinity of these constituents. For example, poor affinity of the pigment for the binder resin results in poor ink storage stability, that is, makes it impossible to prepare inks having stable properties.

In order to stably disperse a pigment in an ink composition, in preparing an ink composition, it is common practice to mix a pigment dispersant with other constituents of the ink composition, for example, a pigment and a binder resin. Extensively used pigment dispersants comprise a pigment adsorption moiety having affinity for the pigment and a moiety which interacts with the binder resin. The moiety which interacts with the binder resin in the pigment dispersant generally comprises a polyester group and a hydrocarbon group. When, for example, an acrylic resin is used as the binder resin, compatibility with the pigment dispersant is so poor that the properties of the resultant inks are often unsatisfactory.

Japanese Patent Laid-Open No. 344795/2004 discloses a method for synthesizing vinyl polymer-grafted polyethyleneimine as an example of a dispersant having improved interaction with a vinyl polymer. The vinyl polymer-grafted polyethyleneimine, however, has poor versatility, for example, because of the necessity of providing many synthesis steps and the gelation under some synthesis conditions.

Further, there is still a demand for a method which can easily improve the compatibility between the pigment dispersant and the acrylic resin.

DISCLOSURE OF THE INVENTION

First Aspect of the Invention

According to the first aspect of the present invention, there are provided a production process of a polymer composition having high solubility in solvents and a polymer composition. In the present invention, the polymerization of a radical polymerizable monomer in a specific solvent can provide a polymer which has a significantly improved solubility in solvents over the conventional polymer produced from the same radical polymerizable monomer. Accordingly, the present invention can also be regarded as a resin improvement method or resin modification method which can render the resin, which cannot be used as an ink binder because of its poor solubility, soluble in solvents.

The present inventor has made extensive and intensive studies and, as a result, has found that the above problems can be solved by the following means.

Specifically, according to the present invention, there is provided a process for producing a polymer composition, comprising polymerizing a radical polymerizable monomer in a solvent containing a compound represented by formula (1) or (2) in the presence of a radical polymerization initiator:

[Chemical formula 1]

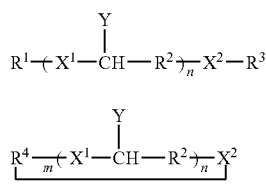

wherein $R^1$ and $R^3$ each independently represent hydrogen or a monovalent hydrocarbon group; $R^2$ and $R^4$ each independently represent a divalent hydrocarbon group, provided that $R^2$ optionally represents nil; Y represents hydrogen, a monovalent hydrocarbon group or a hydroxyalkyl group; m is an integer of zero (0) or 1; n is an integer of 1 to 10; and $X^1$ and $X^2$ each independently represent any of the following divalent substituents:

[Chemical formula 2]

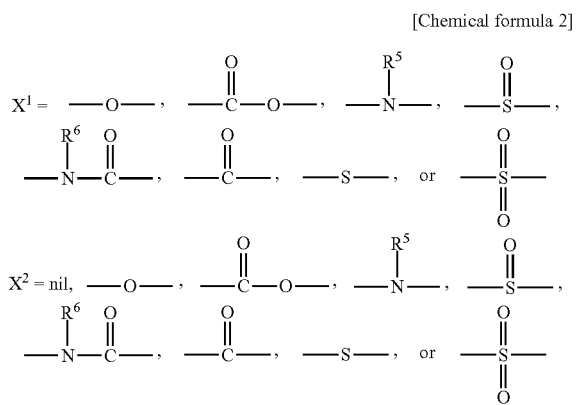

wherein $R^5$ and $R^6$ each independently represent hydrogen, a monovalent hydrocarbon group or a hydroxyalkyl group.

In a preferred embodiment of the production process of a polymer composition according to the present invention, $R^1$ and $R^3$ represent hydrogen or an alkyl group having 1 to 6 carbon atoms, $R^2$ and $R^4$ represent an alkylene group having 1 to 6 carbon atoms, Y represents hydrogen, an alkyl group having 1 to 6 carbon atoms, or a hydroxyalkyl group having 1 to 6 carbon atoms, n is 1 to 6, and $R^5$ and $R^6$ represent hydrogen, an alkyl group having 1 to 6 carbon atoms, or a hydroxyalkyl group having 1 to 6 carbon atoms.

In a preferred embodiment of the production process of a polymer composition according to the present invention, the radical polymerization initiator is one or at least two organic peroxides selected from hydroperoxides, dialkyl peroxides, peroxyesters, diacyl peroxides, peroxycarbonates, peroxyketals, and ketone peroxides.

According to the present invention, there is also provided a polymer composition comprising polymer (A) represented by formula:

[Chemical formula 3]

(A)

wherein S represents a solvent-derived component; $(M)_p$ represents a polymer moiety comprising a radical polymerizable monomer unit M; and p is any integer.

EFFECT OF THE INVENTION

According to the present invention, polymers having high solubility can be produced. Accordingly, in a resin design, an originally sparingly soluble resin can be rendered soluble in a desired solvent, and, thus, the resin can be designed without any concern of solubility.

When the production process according to the present invention is applied to the production of a high-Tg resin such as a methyl methacrylate homopolymer, a coating film strength, which could not have been provided by the conventional method in which the solubility is improved by copolymerization or by lowering the molecular weight of the resin, can be realized. By virtue of this, when the resin composition according to the present invention is used in the binder for inks, properties required of inks, for example, drying properties and scratch resistance, can be improved.

INDUSTRIAL APPLICABILITY

The polymer composition produced by the present invention can be utilized, for example, in various fields such as binder resins for printing inks and their coatings, binder resins for coating materials and their coatings, binder resins for photoresists, color resists, black matrixes and the like, and resins for adhesives. Further, the polymer composition according to the present invention can be utilized, either as such or optionally in combination with other organic materials or inorganic materials, in a wide variety of fields where the polymer composition according to the present invention may be dissolved or mixed in a solvent, fields where the dissolved material is utilized, and fields related thereto.

Second Aspect of Invention

An object of the second aspect of the present invention is to provide a process for producing a polymer composition having excellent compatibility suitable as a constituent of an ink composition. This object can be attained by the polymerization of a radical polymerizable monomer under specific conditions.

Thus, according to the present invention, there is provided a process for producing a polymer composition, comprising polymerizing a radical polymerizable monomer in a pigment dispersant or a pigment dispersant-containing solution in the presence of a radical polymerization initiator.

In a preferred embodiment of the process for producing a polymer composition according to the present invention, the pigment dispersant is a urethane dispersant in which a hydrogen atom is attached to a carbon atom adjacent to —O—, —COO—, —NR$^7$—, —NR$^8$CO— or NR$^9$COO—, wherein R$^7$, R$^8$, and R$^9$ each independently represent hydrogen, a monovalent hydrocarbon group having 1 to 20 carbon atoms, or a monovalent hydroxyalkyl group having 1 to 20 carbon atoms, a polyamine dispersant, or an A-B block copolymer of an A block having a quaternary ammonium base on its side chain with a B block not having a quaternary ammonium base on its side chain, and/or a B-A-B block copolymer.

In a preferred embodiment of the process for producing a polymer composition according to the present invention, the radical polymerization initiator is one or at least two organic peroxides selected from hydroperoxides, dialkyl peroxides, peroxyesters, diacyl peroxides, peroxycarbonates, peroxyketals, and ketone peroxides.

In a preferred embodiment of the process for producing a polymer composition according to the present invention, a compound represented by formula (1) or (2) is used as a solvent:

[Chemical formula 4]

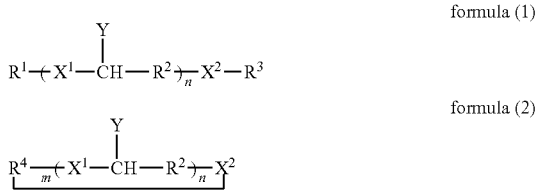

wherein R$^1$ and R$^3$ each independently represent hydrogen or a monovalent hydrocarbon group; R$^2$ and R$^4$ each independently represent a divalent hydrocarbon group, provided that R$^2$ optionally represents nil; Y represents hydrogen, a monovalent hydrocarbon group or a hydroxyalkyl group; m is an integer of zero (0) or 1; n is an integer of 1 to 10; and X$^1$ and X$^2$ each independently represent any of the following divalent substituents:

[Chemical formula 5]

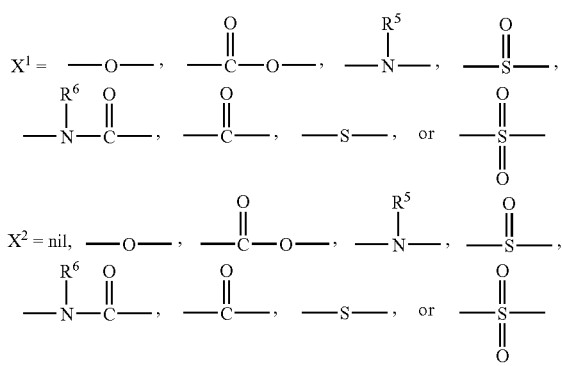

wherein R$^5$ and R$^6$ each independently represent hydrogen, a monovalent hydrocarbon group or a hydroxyalkyl group.

EFFECT OF THE INVENTION

The present invention can provide a polymer composition having excellent compatibility. Therefore, according to the present invention, the compatibility can be improved by a combination of a pigment dispersant with an acrylic binder resin which could not have hitherto been used in inks due to poor compatibility, and, thus, the degree of freedom of ink design can be increased.

Thus, according to the present invention, since a polymer composition which can provide an ink composition comprising highly compatible constituents can be produced, an ink composition can be provided which has improved temporal ink stability and, at the same time, can form a coating film having good coating film properties. In particular, according to the present invention, even resins having a high glass transition temperature (Tg), which have hitherto been regarded as difficult to be used due to poor compatibility, can be used as a constituent of the ink composition, and can realize good compatibility, and, by virtue of synergistic effect of these advantages, a coating film having a significantly improved coating film strength can easily be provided. Further, a significant improvement in gloss of the printed surface can also be realized.

INDUSTRIAL APPLICABILITY

The polymer composition produced by the present invention can be utilized, for example, in various fields such as binder resins for printing inks and their coatings, binder resins for coating materials and their coatings, binder resins for photoresists, color resists, black matrixes and the like, and resins for adhesives. Further, the polymer composition according to the present invention can be utilized, either as such or optionally in combination with other organic materials or inorganic materials, in a wide variety of fields where the polymer composition according to the present invention may be dissolved or mixed in a solvent, fields where the dissolved material is utilized, and fields related thereto.

DETAILED DESCRIPTION OF THE INVENTION

Definition

Figure 1:
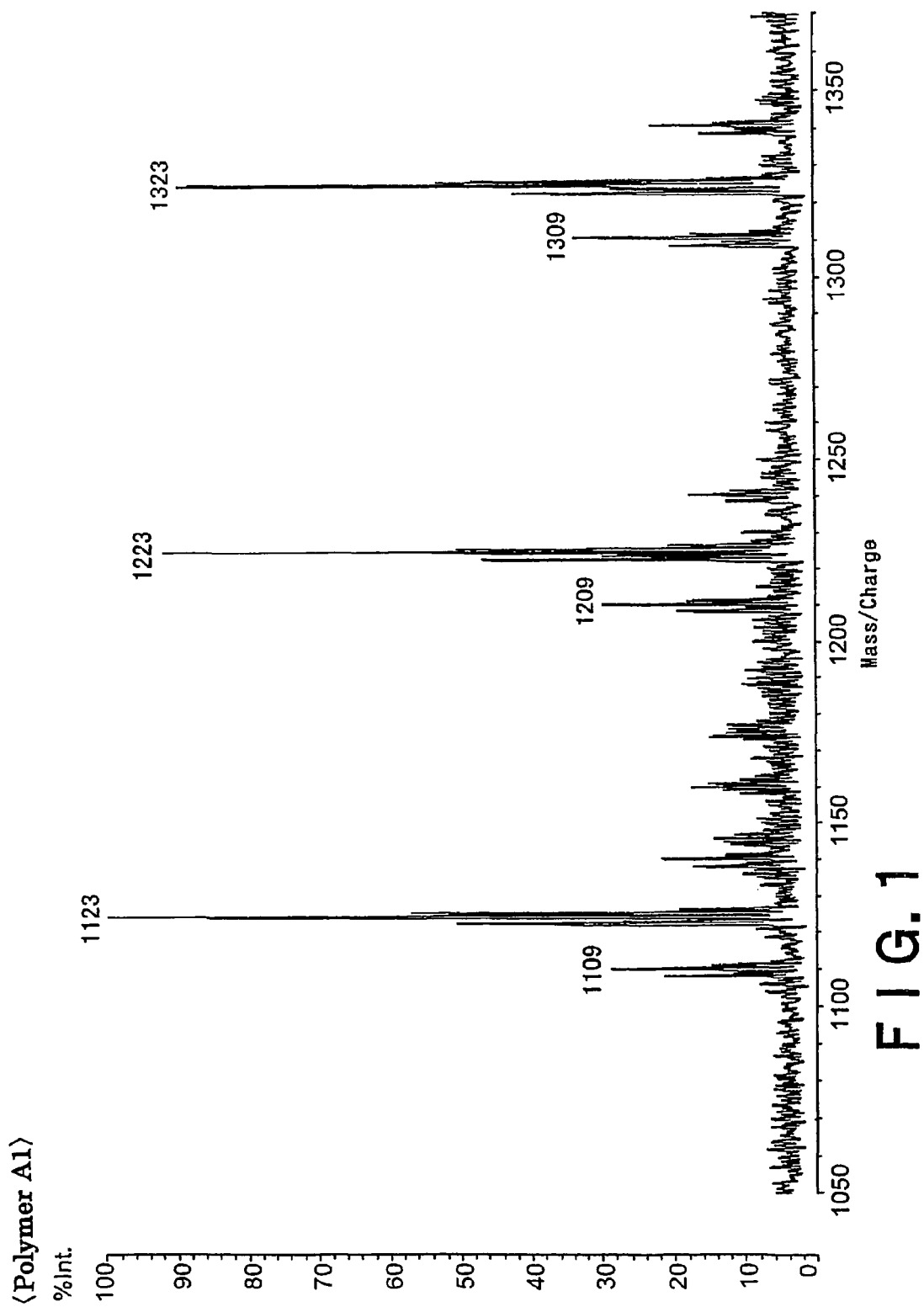
FIG. 1 is a diagram showing data on the measurement of polymer 1 produced in Example A1 with a laser ionization time-of-flight mass spectrometric analyzer.

1) The term "(meth)acryl" means both "acryl" and "methacryl". Likewise the term "(meth)acrylate" means both "acrylate" and "methacrylate."

2) The "divalent hydrocarbon group" or "divalent substituent" has two chains (one chain and another chain), and, thus, any of the one chain and another chain can be attached to other group. Therefore, in the present invention, the term "divalent hydrocarbon group" or "divalent substituent" embraces both the exemplified divalent group, for example, -AB-, and a group, obtained by rotating the exemplified divalent group by 180 degrees, for example, -BA-.

3) The term "nil" means that the corresponding group is absent. Specifically, in the present invention, the expression "$R^2$ and $X^2$ represent "nil"" means that neither $R^2$ nor $X^2$ is present.

First Aspect of the Invention

The production process of a polymer according to the first aspect of the present invention will be described.

<Radical Polymerizable Monomer>

Various monomers, which have at least one radical polymerizable ethylenic double bond in its molecule and are polymerizable in a solvent, which will be described later, in the presence of a radical polymerization initiator can be used as the radical polymerizable monomer in the present invention.

Such radical polymerizable monomers include, for example, (i) styrene, (ii) α-, o-, m-, p-alkyl, nitro, cyano, amide, and ester derivatives of styrene, (iii) (meth)acrylic acid, and (meth)acrylic esters, for example, methyl (meth)acrylate, ethyl (meth)acrylate, n-propyl (meth)acrylate, iso-propyl (meth)acrylate, n-butyl (meth)acrylate, sec-butyl (meth)acrylate, iso-butyl (meth)acrylate, tert-butyl (meth)acrylate, pentyl (meth)acrylate, neopentyl (meth)acrylate, hexyl (meth)acrylate, 2-ethylhexyl (meth) acrylate, octyl (meth)acrylate, iso-octyl (meth)acrylate, nonyl (meth)acrylate, iso-nonyl (meth)acrylate, dodecyl (meth)acrylate, tridecyl (meth)acrylate, stearyl (meth)acrylate, cyclopentyl (meth)acrylate, cyclohexyl (meth)acrylate, 2-methyl cyclohexyl (meth)acrylate, dicyclopentanyl (meth) acrylate, dicyclopentenyloxyethyl (meth)acrylate, dicyclohexyl (meth)acrylate, isobornyl (meth)acrylate, adamantyl (meth)acrylate, allyl (meth)acrylate, propargyl (meth)acrylate, phenyl (meth)acrylate, naphthyl (meth)acrylate, anthracenyl (meth)acrylate, anthranonyl (meth)acrylate, piperonyl (meth)acrylate, salicyl (meth)acrylate, furyl (meth)acrylate, furfuryl (meth)acrylate, tetrahydrofuryl (meth)acrylate, tetrahydrofurfuryl (meth)acrylate, pyranyl (meth)acrylate, benzyl (meth)acrylate, phenethyl (meth)acrylate, cresyl (meth) acrylate, glycidyl (meth)acrylate, glycidyl ether 4-hydroxybutyl (meth)acrylate, 3,4-epoxycyclohexylmethyl (meth)acrylate, 3,4-epoxycyclohexylethyl (meth)acrylate, 1,1,1-trifluoroethyl (meth)acrylate, perfluoroethyl (meth) acrylate, perfluoro-n-propyl (meth)acrylate, perfluoro-iso-propyl (meth)acrylate, heptadecafluorodecyl (meth)acrylate, triphenylmethyl (meth)acrylate, cumyl (meth)acrylate, 3-(N, N-dimethylamino)propyl (meth)acrylate, 2-hydroxyethyl (meth)acrylate, 2-hydroxypropyl (meth)acrylate, 2,3-dihydroxypropyl (meth)acrylate, 4-hydroxybutyl (meth)acrylate, glycerol (meth)acrylate, methoxyethyl (meth)acrylate, ethoxyethyl (meth)acrylate, butoxyethyl (meth)acrylate, 2-cyanoethyl (meth)acrylate, dimethylaminoethyl (meth) acrylate, diethylaminoethyl (meth)acrylate, trimethoxysilylpropyl (meth)acrylate, triethoxysilyipropyl (meth)acrylate, 3-methacryloxypropylmethyldiethoxysilane, and 3-methacryloxypropylmethyldimethoxysilane, (iv) (meth)acrylic acid amide, and (meth)acrylic acid amide derivatives such as (meth)acrylic acid N,N-dimethylamide, (meth)acrylic acid N,N-diethylamide, (meth)acrylic acid N,N-dipropylamide, (meth)acrylic acid N,N-di-iso-propylamide, (meth)acrylic acid butylamide, (meth)acrylic acid stearylamide, (meth)acrylic acid cyclohexylamide, (meth) acrylic acid phenylamide, (meth)acrylic acid benzylamide, and (meth)acrylic acid anthracenylamide, (v) vinyl compounds such as (meth)acrylic acid anilide, (meth)acryloylnitrile, acrolein, vinyl chloride, vinylidene chloride, vinyl fluoride, vinylidene fluoride, N-vinylpyrrolidone, vinylpyridine, N-vinylcarbazole, vinylimidazole, and vinyl acetate, (vi) monomaleimides such as N-benzylmaleimide, N-phenylmaleimide, N-cyclohexylmaleimide, N-laurinmaleimide, and N-(4-hydroxyphenyl)maleimide, and (vii) phthalimides such as N-(meth)acryloylphthalimide.

In the present invention, one of the above exemplified radical polymerizable monomers may be used solely. Alternatively, two or more of the above exemplified radical polymerizable monomers may be used in combination. Further, other monomer(s) copolymerizable with the above radical polymerizable monomers may be used in combination with the radical polymerizable monomers. Accordingly, homopolymers and copolymers of the above radical polymerizable monomers and copolymers of the above radical polymerizable monomers with other monomers fall within the scope of the polymer composition produced in the present invention.

<Solvent>

The solvent used in the present invention comprises a compound represented by formula (1) or (2):

[Chemical formula 6]

$$R^1\!-\!(\!X^1\!-\!\underset{\underset{Y}{|}}{CH}\!-\!R^2\!)_{\!n}\!-\!X^2\!-\!R^3 \quad \text{formula (1)}$$

$$R^4\!-\!(\!X^1\!-\!\underset{\underset{Y}{|}}{CH}\!-\!R^2\!)_{\!n}\!-\!X^2 \quad \text{formula (2)}$$

wherein $R^1$ and $R^3$ each independently represent hydrogen or a monovalent hydrocarbon group; $R^2$ and $R^4$ each independently represent a divalent hydrocarbon group, provided that $R^2$ optionally represents nil; Y represents hydrogen, a monovalent hydrocarbon group or a hydroxyalkyl group; m is an integer of zero (0) or 1; n is an integer of 1 to 10; and $X^1$ and $X^2$ each independently represent any of the following divalent substituents:

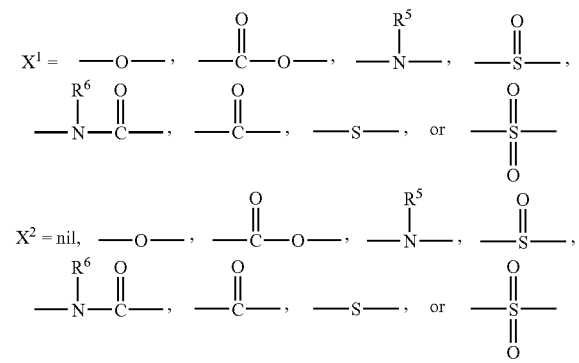

[Chemical formula 7]

wherein $R^5$ and $R^6$ each independently represent hydrogen, a monovalent hydrocarbon group or a hydroxyalkyl group.

$R^1$ and $R^3$ each independently represent hydrogen or a monovalent hydrocarbon group. In the present invention, hydrogen and alkyl groups having 1 to 12 carbon atoms, particularly 1 to 6 carbon atoms, are preferred, and alkyl groups having 1 to 4 carbon atoms are more preferred.

$R^2$ represents a divalent hydrocarbon group. In the present invention, alkylene groups having 1 to 8 carbon atoms, particularly 1 to 6 carbon atoms, are preferred. Alkyl groups having 1 to 4 carbon atoms are more preferred. $R^2$ optionally represents nil. $R^4$ represents a divalent hydrocarbon group. In the present invention, alkylene groups having 1 to 8 carbon atoms, particularly 1 to 6 carbon atoms, are preferred. Alkyl groups having 1 to 4 carbon atoms are more preferred. When m is zero (0), in the compound of formula (2), $R^4$ is absent and $X^2$ and $X^1$ are attached directly to each other.

Y represents hydrogen, a monovalent hydrocarbon group, or hydroxyalkyl. In the present invention, preferably, Y represents hydrogen or an alkyl group having 1 to 6 carbon atoms, particularly 1 to 4 carbon atoms. In the present invention, more preferably, Y represents hydrogen or an alkyl group having 1 to 3 carbon atoms.

n is an integer of 1 to 10, preferably 1 to 8, particularly preferably 1 to 6.

$X^1$ preferably represents —O—, —CO—O—, —$NR^5$—, or —$NR^6$—CO—, particularly preferably —O— or —CO—O—.

$X^2$ preferably represents —O—, —CO—O—, —$NR^5$—, or —$NR^6$—CO—, particularly preferably —O— or —CO—O—. Here the term "nil" means that $X^2$ is absent. Accordingly, when $X^2$ represents "nil," in the compound of formula (2), $R^2$ and $R^4$ are attached directly to each other. When $X^2$ represents "nil" and, at the same time, m is zero (0), $X^1$ and $R^2$ are attached directly to each other.

$R^5$ represents hydrogen or a monovalent hydrocarbon or monovalent hydroxyalkyl group. In the present invention, preferably $R^5$ represents hydrogen or an alkyl or hydroxyalkyl group having 1 to 8 carbon atoms, particularly 1 to 6 carbon atoms, particularly preferably hydrogen, an alkyl group having 1 to 3 carbon atoms, or a hydroxyalkyl group having 1 to 3 carbon atoms.

$R^6$ represents hydrogen, a monovalent hydrocarbon group, or a monovalent hydroxyalkyl group. In the present invention, preferably, $R^6$ represents hydrogen or an alkyl or hydroxyalkyl group having 1 to 8 carbon atoms, particularly 1 to 6 carbon atoms, particularly preferably hydrogen, an alkyl group having 1 to 3 carbon atoms, or a hydroxyalkyl group having 1 to 3 carbon atoms.

In the present invention, a solvent consisting of a compound represented by formula (1) only, a solvent consisting of a compound represented by formula (2) only, a mixed solvent composed of a compound represented by formula (1) and a compound represented by formula (2), and a solvent composed of any one of or both a compound represented by formula (1) and a compound represented by formula (2) and other solvent compound(s) (that is, a solvent compound(s) other than the compounds represented by formulae (1) and (2)) may be used. Other solvent compounds include, for example, toluene and xylene. When these other solvent compounds are used in combination with the above solvent, the content of the compounds of formuale (1) and (2) is preferably at least not less than 30% by weight based on 100% by weight of the total solvent amount. When the content of the compounds of formulae (1) and (2) is less than 30% by weight, the effect of the present invention is sometimes unsatisfactory.

When a reaction mechanism which will be described later is taken into consideration, compounds having hydrogen in their molecule, which can easily be eliminated, are suitable as compounds represented by formula (1) or (2) in the present invention. Here the expression "hydrogen which can easily be eliminated" refers to hydrogen attached to a carbon atom adjacent to $X^1$ or $X^2$. $X^1$ and $X^2$ represent a lone electron pair or an atom or atomic group having a ∪ electron and thus are considered as electrically stabilizing the carbon atom from which hydrogen has been eliminated.

Among the compounds represented by formula (1) or (2), particularly preferred compounds include, for example, (i) polyalkylene glycols, for example, ethylene glycol, propylene glycol, diethylene glycol, and dipropylene glycol, (ii) polyalkylene glycol monoalkyl ethers, for example, ethylene glycol monomethyl ether, ethylene glycol monoethyl ether, ethylene glycol monopropyl ether, ethylene glycol monobutyl ether, ethylene glycol monoethyl hexyl ether, propylene glycol monomethyl ether, propylene glycol monoethyl ether, propylene glycol monopropyl ether, propylene glycol monobutyl ether, diethylene glycol monomethyl ether, diethylene glycol monoethyl ether, diethylene glycol monopropyl ether, diethylene glycol monobutyl ether, dipropylene glycol monomethyl ether, dipropylene glycol monoethyl ether, triethylene glycol monomethyl ether, triethylene glycol monoethyl ether, triethylene glycol monobutyl ether, tripropylene glycol monomethyl ether, tripropylene glycol monoethyl ether, and tripropylene glycol monobutyl ether, (iii) polyalkylene glycol dialkyl ethers, for example, ethylene glycol dimethyl ether, ethylene glycol diethyl ether, ethylene glycol dipropyl ether, ethylene glycol dibutyl ether, ethylene glycol methylethyl ether, propylene glycol dimethyl ether, propylene glycol diethyl ether, propylene glycol dipropyl ether, propylene glycol dibutyl ether, propylene glycol methylethyl ether, diethylene glycol dimethyl ether, diethylene glycol diethyl ether, diethylene glycol dibutyl ether, tetraethylene glycol dimethyl ether, and tetraethylene glycol dibutyl ether, (iv) polyalkylene glycol monoalkyl ether acetates, for example, ethylene glycol monomethyl ether acetate, ethylene glycol monoethyl ether acetate, ethylene glycol monopropyl ether acetate, ethylene glycol monoisopropyl ether acetate, ethylene glycol monobutyl ether acetate, propylene glycol monomethyl ether acetate, propylene glycol monoethyl ether acetate, propylene glycol monopropyl ether acetate, propylene glycol monoisopropyl ether acetate, propylene glycol monobutyl ether acetate, diethylene glycol monomethyl ether acetate, diethylene glycol monoethyl ether acetate, diethylene glycol monobutyl ether acetate, and triethylene glycol monomethyl ether acetate, (v) alkyl esters, for example, butyl acetate, 3-methoxybutyl acetate, hexyl acetate, 2-ethylhexyl acetate, ethyl propionate, propyl propionate, and ethyl lactate, (vi) cyclic ethers, for example, dioxane, tetrahydrofuran, and tetrahydropyran, (vii) cyclic amines, for example, morpholine, 4-(2-hydroxyethyl)morpholine, 4-(3-hydroxypropyl)morpholine, and 4-methylmorpholine, (viii) amides, for example, N,N-dimethylformamide, N,N-dimethylacetamide, 2-pyrrolidone, N-methyl-2-pyrrolidone, N-ethyl-2-pyrrolidone, N-(2-hydroxyethyl)-2-pyrrolidone, caprolactam, and 1,3-dimethylimidazolidone, (ix) cyclic esters, for example, caprolactone, γ-butyrolactone, and valerolactone, (x) cyclic ketones, for example, cyclohexanone, and (xi) sulfolanes, for example, tetramethylene sulfone.

<Radical Polymerization Initiator>

Preferred radical polymerization initiators usable in the present invention include organic peroxides, for example, hydroperoxides, dialkyl peroxides, peroxyesters, diacyl peroxides, peroxycarbonates, peroxyketals, and ketone peroxides. Specific examples of such compounds include the following compounds. Among the following compounds, compounds marked with "*" on their upper right are particularly preferred in the present invention.

Specifically, specific examples of radical polymerization initiators include (i) hydroperoxides, for example, t-butyl hydroperoxide*, 1,1,3,3-tetramethylbutyl hydroperoxide*, p-menthane hydroperoxide, cumene hydroperoxide*, and diisopropylbenzene hydroperoxide, (ii) dialkyl peroxides, for example, di-t-butyl peroxide*, di-t-hexyl peroxide*, t-butylcumyl peroxide, dicumyl peroxide, 2,5-dimethyl-2,5-di(t-butylperoxy)hexane, 2,5-dimethyl-2,5-di(t-butyl peroxy)hexyne-3, and di(2-t-butyl peroxyisopropyl)benzene, (iii) peroxyesters, for example, 1,1,3,3-tetramethylbutyl peroxyneodecanoate*, α-cumyl peroxyneodecanoate*, t-butyl peroxyneodecanoate*, t-hexyl peroxyneodecanoate*, 1-cyclohexyl-1-methylethyl peroxyneodecanoate*, t-butyl peroxyneoheptanoate, t-hexyl peroxypivalate*, t-butyl peroxypivalate*, 1,1,3,3-tetramethylbutylperoxy-2-ethyl hexanoate*, t-amylperoxy-2-ethyl hexanoate, t-butyl peroxy-2-ethyl hexanoate*, t-hexyl peroxy-2-ethyl hexanoate*, t-butyl peroxy-2-ethylhexyl monocarbonate*, t-amyl peroxy-3,5,5-trimethyl hexanoate, t-butyl peroxy-3,5,5-trimethyl hexanoate*, t-butyl peroxyacetate*, t-butyl peroxyisobutyrate*, t-butyl peroxybenzoate*, t-butyl peroxy-3-methyl benzoate*, t-hexyl peroxybenzoate*, di-t-butyl peroxytrimethyl adipate, di-t-butyl peroxyhexahydroterephthalate, t-butyl peroxymaleate, t-butyl peroxylaurate*, t-butyl peroxyisopropyl monocarbonate*, t-hexyl peroxyisopropyl monocarbonate*, 2,5-dimethyl-2,5-di(2-ethylhexanoyl peroxy)hexane*, 2,5-dimethyl-2,5-di(3-methylbenzoyl peroxy)hexane*, and 2,5-dimethyl-2,5-di(benzoyl peroxy)hexane*, (iv) diacyl peroxides, for example, diisobutyryl peroxide, di(3,5,5-trimethylhexanoyl) peroxide*, dilauroyl peroxide*, dibenzoyl peroxide*, di(3-methylbenzoyl)peroxide*, benzoyl(3-methylbenzoyl)peroxide*, di-n-octanoyl peroxide, distearoyl peroxide*, disuccinic acid peroxide*, and di(4-methylbenzoyl)peroxide, (v) peroxycarbonates, for example, di(2-ethoxyethyl) peroxydicarbonate, di-n-propyl peroxydicarbonate, diisopropyl peroxydicarbonate, t-butyl peroxyisopropyl carbonate, 1,6-bis(t-butyl peroxy carbonyloxy)hexane, di(3-methoxybutyl) peroxydicarbonate, di-sec-butyl peroxydicarbonate, t-butylperoxy-2-ethylhexyl carbonate, di(2-ethylhexyl) peroxydicarbonate, di-1-methylheptyl peroxydicarbonate, and di(4-t-butylcyclohexyl) peroxydicarbonate*, (vi) peroxyketals, for example, 2,2-di(4,4-di-t-butyl peroxycyclohexyl)propane, 2,2-di(t-butylperoxy)butane*, 1,1-di(t-butylperoxy)cyclohexane*, 1,1-di(t-butylperoxy)-2-methylcyclohexane*, 1,1-di(t-butylperoxy)-3,3,5-trimethylcyclohexane, 1,1-di(t-hexylperoxy)cyclohexane*, 1,1-di(t-hexylperoxy)-3,3,5-trimethylcyclohexane*, and n-butyl-4,4-di(t-butyl peroxy)valerate*, and (vii) ketone peroxides, for example, acetylacetone peroxide, cyclohexanone peroxide, and methylcyclohexanone peroxide.

Among them, organic peroxides such as dialkyl peroxide, peroxyesters, and diacyl peroxides are preferred.

These radical polymerization initiators may be used either solely or in a combination of two or more.

<Production Process of Polymer Composition>

The production process of a polymer composition according to the present invention comprises polymerizing the above radical polymerizable monomer in a solvent composed of a compound represented by formula (1) or (2) in the presence of a radical polymerization initiator.

In the present invention, the radical polymerizable monomer and the radical polymerization initiator are added to the solvent composed of a compound represented by formula (1) or (2) preferably by (i) a method in which a mixture of the radical polymerizable monomer with the radical polymerization initiator is added or (ii) a method in which the radical polymerizable monomer is first added followed by the addition of the radical polymerization initiator. Alternatively, (iii) a method may be adopted in which the radical polymerization initiator is added to the solvent composed of a compound represented by formula (1) or (2) followed by the addition of the radical polymerizable monomer.

When the resin composition according to the present invention is produced as a random, block or graft copolymer of a plurality of radical polymerizable monomers, the division of the method for supplying the radical polymerizable monomers and the polymerization process into a plurality of steps, or a combination of a plurality of polymerization processes may be adopted so as to be suitable for the production of the above copolymers.

In the present invention, the amount of the radical polymerizable monomer used is preferably such that the concentration of the radical polymerizable monomer in the solvent is 10 to 80% by weight, particularly preferably 20 to 60% by weight. When the monomer concentration is less than 10% by weight, there is a tendency that the monomer is not satisfactorily polymerized and the amount of the unreacted monomer is increased. On the other hand, a concentration of the radical polymerizable monomer in the solvent exceeding 80% by weight is disadvantageous from the industrial viewpoint, because the control of heat generation during the polymerization is difficult and, further, the viscosity of the resultant polymer solution is excessively high.

The radical polymerization initiator may be used in any desired amount. The addition amount of the radical polymerization initiator, however, is generally in the range of 0.05 to 25% by weight, preferably in the range of 0.1 to 20% by weight, based on 100% by weight of the radical polymerizable monomer. When the addition amount of the radical polymerization initiator is less than 0.05% by weight, a part of the monomer remains unreacted. This is unfavorable, for example, from the viewpoints of odor of the monomer and skin irritation. On the other hand, an addition amount of the radical polymerization initiator exceeding 25% by weight is industrially disadvantageous, for example, from the viewpoints of heat generation during the reaction.

The polymerization temperature may vary depending upon the initiator used. Preferably, however, the polymerization temperature is one-hour half-life temperature of the initiator ±20° C. When the reaction is carried out at a temperature below the lower limit of the above-defined temperature, disadvantageously, the amount of the unreacted initiator or monomer is increased, or a lot of time is taken for the synthesis. On the other hand, when the reaction is carried out at a temperature above the upper limit of the above-defined temperature, disadvantageously, due to excessively rapid decomposition of the initiator, the monomer is not satisfactorily reacted and, consequently, a large amount of the monomer remains unreacted.

A mechanism through which the solubility of the resin is improved by the present invention will be described based on a terminal solvent addition-type resin production reaction. However, it should be noted that the present invention is not limited to this reaction mechanism.

In general, radical polymerization is carried out by a method using a radical polymerizable monomer, a radical polymerization initiator, and optionally a chain transfer agent and comprises the following three stages (reference document: "Kaitei Kobunshi Gosei No Kagaku (Revised Edition of Polymer Synthesis Chemistry)," published by Kagaku-Dojin Publishing Company, Inc., Second Edition, (publication date: Jan. 10, 1979)).

<Reaction Mechanism 1>

Start $I \rightarrow I_1. + I_2.$ (i)

$I_1. + M \rightarrow I_1 - M.$ (ii)

Growth $I_1 - M. + M \rightarrow I_1 - M - M.$ (iii)

Stop (recombination) $2I_1 - M \ldots M. \rightarrow I_1 - M \ldots M - M \ldots M - I_1$ (iv)

Stop (disproportionation) $2I_1 - M \ldots M. \rightarrow I_1 - M \ldots M - H + I_1 - M \ldots M - M$ (v)

wherein I represents a radical polymerization initiator; $I_1.$ and $I_2.$ represent a radical polymerization initiator-derived radical; M represents a radical polymerizable monomer; and M . . . M represents a polymer.

Further, in the radical polymerization, it is well known that chain transfer, which is a radical substitution reaction, takes place competitively with a growth reaction. All of substances present in the polymerization system participate in the chain transfer. In the solution polymerization, however, it is considered that the following reaction of chain transfer to a solvent is involved in a stop reaction.

$I_1 - M \ldots M. + S - H \rightarrow I_1 - M \ldots M - H + S.$ (vi)

wherein S-H represents a solvent and S. represents a radical produced by the chain transfer reaction.

When the resultant solvent-derived radical "S." is reacted with a radical polymerizable monomer M present in the system (restart reaction), polymer (A) can be produced by the following reaction.

<Restart Reaction>

Start $S. + M \rightarrow S - M.$ (vii)

Growth $S - M. + M \rightarrow S - M - M.$ (viii)

Stop $S - M \ldots M. + S - H \rightarrow S - M \ldots M - H + S.$ (ix)

wherein S. represents a solvent-derived radical; M represents a radical polymerizable monomer; and M . . . M represents a polymer.

In the above <restart reaction>, the proportion of polymer (A) produced should not vary depending upon the type of the initiator. The results of analysis of the polymer composition, produced by the production process of the present invention, by MALDI TOF-MS (laser ionization time-of-flight mass spectrometric analyzer; manufactured by Shimadzu Seisakusho Ltd.; AXIMA-CFR plus, matrix; dithranol, cationization agent; NaI), however, show that the proportion of polymer (A) produced varies depending upon the type of the initiator (FIGS. 2 and 3), suggesting the participation of another reaction mechanism that the type of the initiator is involved in the proportion of polymer (A) produced.

<Reaction Mechanism 2>

Start $I \rightarrow I_1. + I_2.$ (x)

$I_1. + S - H \rightarrow I_1 - H + S.$ (xi)

(chain transfer to solvent molecule)

$S. + M \rightarrow S - M.$ (xii)

Growth $S - M. + M \rightarrow S - M - M.$ (xiii)

Stop $S - M \ldots M. + S - H \rightarrow S - M \ldots M - H + S.$ (xiv)

wherein I represents a radical polymerization initiator; $I_1.$ and $I_2.$ represent a radical polymerization initiator decomposition-derived radical; S-H represents a solvent molecule; M represents a radical polymerizable monomer; and M . . . M represents a polymer.

The above reaction mechanism supports the analytical results that the proportion of polymer (A) produced varies depending upon the type of the initiator. The above mechanism is considered to provide the polymer composition according to the present invention comprising the following polymer (A) having a solvent-derived component S at its end.

[Chemical formula 8]

(A)

wherein S represents a solvent-derived component; $(M)_p$ represents a polymer moiety comprising a radical polymerizable monomer unit M; and p is an arbitrary integer.

When the polymer composition according to the present invention is produced, the following polymer (B), together with the above polymer (A), is sometimes produced as a by-product. Polymer (B) may be present in the polymer composition according to the present invention. Accordingly, the polymer composition according to the present invention refers to a composition comprising polymer (A) as an indispensable component and optionally a component other than polymer (A), for example, polymer (B).

[Chemical formula 9]

(B)

wherein $I_1$ represents a radical polymerization initiator-derived component; $(M)_q$ represents a polymer moiety comprising a radical polymerizable monomer unit M; and q is an arbitrary integer.

The polymer composition according to the present invention has high solubility in solvents.

Further, in the present invention, for example, the contents and properties of the polymer composition can easily be regulated, for example, by the selection of the radical polymerizable monomer, the solvent, and the radical polymerization initiator and the selection of polymerization conditions. Accordingly, a polymer composition suitable particularly for specific applications can be produced as desired. Thus, the polymer composition according to the present invention can be utilized in a wide variety of applications.

The present invention can be practiced without any problem in the copresence of other ingredients contained in ink, for example, pigments, dispersants, polymers, and additives.

The use of the polymer composition according to the present invention, for example, in an ink composition, particularly as a binder resin for an ink composition, can realize an improvement in fastness properties, rubbing/scratch resistance, fast drying properties, color development and other properties of the ink composition over those of the conventional ink composition.

Second Aspect of the Invention

<Pigment Dispersant>

The pigment dispersant according to the present invention may be any pigment dispersant.

In the present invention, preferred pigment dispersants include (i) urethane dispersants, (ii) polyamine dispersants, and (iii) A-B block copolymers of an A block having a quaternary ammonium base on its side chain with a B block not having a quaternary ammonium base on its side chain, and/or B-A-B block copolymers. Particularly preferred pigment dispersants include: urethane dispersants in which a hydrogen atom is attached to a carbon atom adjacent to —O—, —COO—, —NR$^7$—, —NR$^8$CO— or —NR$^9$COO—, wherein R$^7$, R$^8$, and R$^9$ each independently represent hydrogen, a monovalent hydrocarbon group having 1 to 20 carbon atoms, preferably 1 to 10 carbon atoms, or a monovalent hydroxyalkyl group having 1 to 20 carbon atoms, preferably 1 to 10 carbon atoms; polyamine dispersants; or A-B block copolymers of an A block having a quaternary ammonium base on its side chain with a B block not having a quaternary ammonium base on its side chain, and/or B-A-B block copolymers.

Some of the compounds usable as the pigment dispersants in the present invention are known in the art. For example, (i) urethane dispersants are described, for example, in Japanese Patent No. 1879529, Japanese Patent Laid-Open No. 166318/1985, Japanese Patent Laid-Open No. 37845/2002, and Japanese Patent No. 3101824, (ii) polyamine dispersants are described, for example, in Japanese Patent No. 1940521, Japanese Patent No. 1570685, Japanese Patent No. 3504268, and Japanese Translation of PCT Publication No. 509205/2003, and (iii) A-B block copolymers of an A block having a quaternary ammonium base on its side chain with a B block not having a quaternary ammonium base on its side chain, and/or B-A-B block copolymers are described, for example, in Japanese Patent No. 2680594, Japanese Patent Laid-Open No. 66235/2004, and Japanese Patent No. 3590382.

Compounds utilizable as the pigment dispersant in the present invention are also commercially available. For example, "Disperbyk-161," "Disperbyk-164," "Disperbyk-165," "Disperbyk-182," and "Disperbyk-184," manufactured by BYK-Chemie, and "EFKA46" and "EFKA47" manufactured by EFKA CHEMICALS (all the above products being tradenames) correspond to (i) urethane dispersants, "Solsperse 33500," "Solsperse 32000," and "Solsperse 24000," manufactured by The Lubrizol Corporation, and "Ajisper PB821" and "Ajisper PB822" manufactured by Ajinomoto Fine-Techno. Co. Inc. (all the above products being tradenames) correspond to (ii) polyamine dispersants, and "Disperbyk-2000" and "Disperbyk-2001" manufactured by BYK-Chemie (all the above products being tradenames) correspond to (iii) A-B block copolymers of an A block having a quaternary ammonium base on its side chain with a B block not having a quaternary ammonium base on its side chain, and/or B-A-B block copolymers. These commercially available products are preferred dispersants in the present invention.

The pigment dispersant according to the present invention is preferably in the form of a liquid or viscous liquid at room temperature or in a form or under temperature conditions in which the radical polymerizable monomer is polymerized, so that the radical polymerizable monomer can be polymerized in a solution containing the pigment dispersant in the presence of the radical polymerization initiator.

<Solvent>

When a solvent is used in the polymerization process according to the present invention, the solvent preferably comprises a compound represented by formula (1) or (2).

[Chemical formula 10]

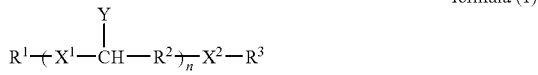

formula (1)

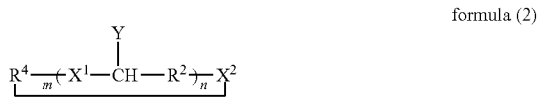

formula (2)

wherein R$^1$ and R$^3$ each independently represent hydrogen or a monovalent hydrocarbon group; R$^2$ and R$^4$ each independently represent a divalent hydrocarbon group, provided that R$^2$ optionally represents nil; Y represents hydrogen, a monovalent hydrocarbon group or a hydroxyalkyl group; m is an integer of zero (0) or 1; n is an integer of 1 to 10; and X$^1$ and X$^2$ each independently represent any of the following divalent substituents:

[Chemical formula 11]

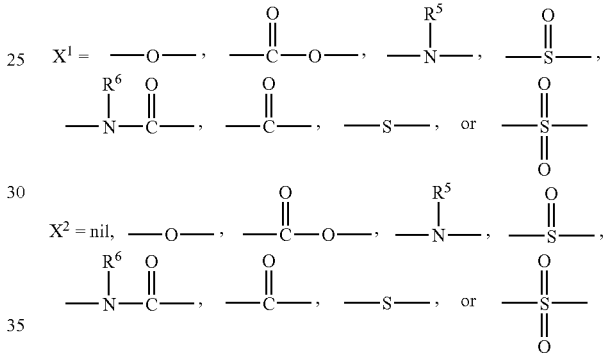

wherein R$^5$ and R$^6$ each independently represent hydrogen, a monovalent hydrocarbon group or a hydroxyalkyl group.

R$^1$ and R$^3$ each independently represent hydrogen or a monovalent hydrocarbon group. In the present invention, hydrogen and alkyl groups having 1 to 20 carbon atoms, particularly 1 to 16 carbon atoms, are preferred, and alkyl groups having 1 to 12 carbon atoms are more preferred.

R$^2$ represents a divalent hydrocarbon group. In the present invention, alkylene groups having 1 to 12 carbon atoms, particularly 1 to 10 carbon atoms, are preferred. Alkyl groups having 1 to 8 carbon atoms are more preferred. R$^2$ optionally represents nil. R$^4$ represents a divalent hydrocarbon group. In the present invention, alkylene groups having 1 to 12 carbon atoms, particularly 1 to 10 carbon atoms, are preferred. Alkyl groups having 1 to 8 carbon atoms are more preferred. When m is zero (0), in the compound of formula (2), R$^4$ is absent and X$^2$ and X$^1$ are attached directly to each other.

Y represents hydrogen, a monovalent hydrocarbon group, or a hydroxyalkyl group. In the present invention, preferably, Y represents hydrogen or an alkyl group having 1 to 12 carbon atoms, particularly 1 to 10 carbon atoms. In the present invention, more preferably, Y represents hydrogen or an alkyl group having 1 to 8 carbon atoms.

n is an integer of 1 to 10, preferably 1 to 8, particularly preferably 1 to 6.

X$^1$ preferably represents —O—, —CO—O—, —NR$^5$—, or —NR$^6$—CO—.

X$^2$ preferably represents —O—, —CO—O—, —NR$^5$—, or —NR$^6$—CO—. Here the term "nil" means that X$^2$ is absent.

Accordingly, when $X^2$ represents "nil," in the compound of formula (2), $R^2$ and $R^4$ are attached directly to each other. When $X^2$ represents "nil" and, at the same time, m is zero (0), $X^1$ and $R^2$ are attached directly to each other.

$R^5$ represents hydrogen or a monovalent hydrocarbon or monovalent hydroxyalkyl group. In the present invention, preferably $R^5$ represents hydrogen or an alkyl or hydroxyalkyl group having 1 to 12 carbon atoms, particularly 1 to 8 carbon atoms, particularly preferably hydrogen, an alkyl group having 1 to 6 carbon atoms, or a hydroxyalkyl group having 1 to 6 carbon atoms.

$R^6$ represents hydrogen, a monovalent hydrocarbon group, or a monovalent hydroxyalkyl group. In the present invention, preferably, $R^6$ represents hydrogen or an alkyl or hydroxyalkyl group having 1 to 12 carbon atoms, particularly 1 to 8 carbon atoms, particularly preferably hydrogen, an alkyl group having 1 to 6 carbon atoms, or a hydroxyalkyl group having 1 to 6 carbon atoms.

In the present invention, a solvent consisting of a compound represented by formula (1) only, a solvent consisting of a compound represented by formula (2) only, a mixed solvent composed of a compound represented by formula (1) and a compound represented by formula (2), and a solvent composed of any one of or both a compound represented by formula (1) and a compound represented by formula (2) and other solvent compound(s) (that is, a solvent compound(s) other than the compounds represented by formulae (1) and (2)) may be used. Other solvent compounds include, for example, toluene and xylene. When these other solvent compounds are used in combination with the above solvent, the content of the compounds of formulae (1) and (2) is preferably at least not less than 30% by weight based on 100% by weight of the total solvent amount. When the content of the compounds of formulae (1) and (2) is less than 30% by weight, the effect of the present invention is sometimes unsatisfactory.

Among the compounds represented by formula (1) or formula (2), particularly preferred compounds include, for example, compounds exemplified in the first aspect of the present invention. Further, it should be noted that the contents described in connection with the first aspect of the present invention are incorporated in the second aspect of the present invention.

<Radical Polymerizable Monomer>/<Radical Polymerization Initiator>

The radical polymerizable monomer and the radical polymerization initiator may be the same as those described in the first aspect of the present invention.

<Production Process of Polymer Composition>

The production process of a polymer composition according to the present invention comprises polymerizing a radical polymerizable monomer in a pigment dispersant or a pigment dispersant-containing solution in the presence of a radical polymerization initiator.

In the present invention, the radical polymerizable monomer and the radical polymerization initiator are added preferably by (i) a method in which the radical polymerizable monomer is first added to the pigment dispersant or the pigment dispersant-containing solution followed by the addition of the radical polymerization initiator, or (ii) a method in which a mixture of the radical polymerizable monomer with the radical polymerization initiator is added to the pigment dispersant or the pigment dispersant-containing solution. Alternatively, use may be made of (iii) a method in which the radical polymerization initiator is added to the pigment dispersant or the pigment dispersant-containing solution followed by the addition of the radical polymerizable monomer.

When the resin composition according to the present invention is produced as a random, block or graft copolymer of a plurality of radical polymerizable monomers, for example, a radical polymerizable monomer supply method and a polymerization process can be properly determined so as to be suitable for the production of the above copolymers.

The amounts of the radical polymerizable monomer, radical polymerization initiator, and pigment dispersant used in the production of the polymer composition according to the present invention are not particularly limited.

In order to efficiently produce the preferred polymer composition according to the present invention, the amount of the radical polymerizable monomer used is preferably such that the concentration of the radical polymerizable monomer in the pigment dispersant or the pigment dispersant-containing solution is 10 to 80% by weight, particularly 15 to 70% by weight. When the monomer concentration is less than 10% by weight, there is a tendency that the monomer is not satisfactorily polymerized and the amount of the unreacted monomer is increased. On the other hand, a concentration of the radical polymerizable monomer in the solution exceeding 80% by weight is disadvantageous from the industrial viewpoint, because the control of heat generation during the polymerization is difficult and, further, the viscosity of the resultant polymer solution is excessively high.

The pigment dispersant may be used in any desired amount. Preferably, however, the pigment dispersant is added so that the dispersant/solvent weight ratio is 1/99 to 99/1, preferably 5/95 to 95/5. When the amount of the pigment dispersant used is outside the above-defined range, disadvantageously, the effect of the present invention cannot be satisfactorily attained.

The radical polymerization initiator may be used in any desired amount. The addition amount of the radical polymerization initiator, however, is generally in the range of 0.05 to 30% by weight, preferably in the range of 0.1 to 25% by weight, based on 100% by weight of the radical polymerizable monomer. When the addition amount of the radical polymerization initiator is less than 0.05% by weight, a part of the monomer remains unreacted. This is unfavorable, for example, from the viewpoints of odor of the monomer and skin irritation. On the other hand, an addition amount of the radical polymerization initiator exceeding 30% by weight is industrially disadvantageous, for example, from the viewpoints of heat generation during the reaction.

The polymerization temperature may vary depending upon the initiator used. Preferably, however, the polymerization temperature is one-hour half-life temperature of the initiator ±20° C. When the reaction is carried out at a temperature below the lower limit of the above-defined temperature, disadvantageously, the amount of the unreacted initiator or monomer is increased, or a lot of time is taken for the synthesis. On the other hand, when the reaction is carried out at a temperature above the upper limit of the above-defined temperature, disadvantageously, due to excessively rapid decomposition of the initiator, the monomer is not satisfactorily reacted and, consequently, a large amount of the monomer remains unreacted.

The polymer composition produced by the present invention has a weight average molecular weight of 3,000 to 200,000 as measured by GPC measurement using polystyrene as a standard and can be mixed with various ingredients, for example, pigments and optionally a solvent and various assistants to prepare an ink composition.

Further, in the present invention, for example, the contents and properties of the polymer composition can easily be regulated, for example, by the selection of the radical polymerizable monomer and the radical polymerization initiator and the selection of polymerization conditions. Accordingly, a polymer composition suitable particularly for specific applications can be produced as desired. Thus, the polymer composition according to the present invention can be utilized in a wide variety of applications.

The polymer composition according to the present invention can be produced without any problem in the copresence of other ingredients contained in ink, for example, pigments, polymers, and additives.

The use of the polymer composition according to the present invention, for example, as a binder resin for an ink composition, can realize a significant improvement in fastness properties, rubbing/scratch resistance, fast drying properties, color development, gloss of printed face and the like over those of the conventional ink composition.

EXAMPLES

The following Examples and Comparative Examples further illustrate the present invention. However, it should be noted that the present invention is not limited to these Examples.

First Aspect of Invention

Example A1

Synthesis of Polymer A1

γ-Butyrolactone (hereinafter referred to as "GBL") (300 parts by weight) was placed in a four-necked flask equipped with a stirrer and a nitrogen introduction tube, and the flask was heated to 100° C. with a mantle heater. A mixed liquid composed of 200 parts by weight of methyl methacrylate ("MMA"; "ACRYESTER M" manufactured by Mitsubishi Rayon Co., Ltd.) and 3.60 parts by weight of t-butyl peroxy-2-ethyl hexanoate (hereinafter referred to as "PERBUTYL O"; manufactured by Nippon Oils & Fats Co., Ltd.) was added dropwise thereto through a dropping funnel over a period of 1.5 hr. During the dropwise addition, the temperature within the flask was kept at 100±1° C. After the completion of the dropwise addition, 0.6 part by weight of "PERBUTYL O" was added, and the mixture was stirred with heating at 100° C. for one hr. Thereafter, 0.6 part by weight of "PERBUTYL O" was added, and the mixture was further allowed to react at 100° C. for 2 hr to give a colorless transparent MMA polymer solution.

After the completion of the reaction, the reaction solution was cooled, and the weight average molecular weight of the resultant polymer A1 was determined by gel permeation chromatography with a GPC measuring device ("HLC-8220GPC" manufactured by Tosoh Corporation) and was found to be 29000 (as determined using polystyrene as a standard). Further, the solid content was determined by heating the product in a 150° C. oven for 2 hr and was found to be 42.0%.

Example A2

Synthesis of Polymer A2

A colorless transparent MMA polymer solution was synthesized in the same manner as in polymer A1, except that diethylene glycol diethyl ether (hereinafter referred to as "DEDG") was used as the solvent and the dropwise addition amount of "PERBUTYL O" was changed to 2.40 parts by weight. The weight average molecular weight of polymer A2 thus obtained was determined by GPC measurement in the same manner as in Example A1 and was found to be 29900 (as determined using polystyrene as a standard). Further, the solid content was determined by heating the product in a 150° C. oven for 2 hr and was found to be 40.8%.

Example A3

Synthesis of Polymer A3

A colorless transparent MMA polymer solution was synthesized in the same manner as in polymer A1, except that ethylene glycol monobutyl ether acetate (hereinafter referred to as "BGAc") was used as the solvent and the dropwise addition amount of "PERBUTYL O" was changed to 2.80 parts by weight. The weight average molecular weight of polymer A3 thus obtained was determined by GPC measurement in the same manner as in Example A1 and was found to be 28900 (as determined using polystyrene as a standard). Further, the solid content was determined by heating the product in a 150° C. oven for 2 hr and was found to be 40.2%.

Example A4

Synthesis of Polymer A4

A colorless transparent MMA/BMA copolymer solution was synthesized in the same manner as in polymer A2, except that a mixture of 180 parts by weight of MMA with 20 parts by weight of butyl methacrylate (BMA) ("ACRYESTER B" manufactured by Mitsubishi Rayon Co., Ltd.) was used as the radical polymerizable monomer.

The weight average molecular weight of the resultant polymer A4 was determined by GPC measurement in the same manner as in Example A1 and was found to be 30500 (as determined using polystyrene as a standard). Further, the solid content was determined by heating the product in a 150° C. oven for 2 hr and was found to be 40.0%.

Example A5

Synthesis of Polymer A5

A colorless transparent MMA/ETMA copolymer solution was synthesized in the same manner as in polymer A2, except that a mixture of 180 parts by weight of MMA with 20 parts by weight of ethoxyethyl methacrylate (ETMA) ("ACRYESTER ET" manufactured by Mitsubishi Rayon Co., Ltd.) was used as the radical polymerizable monomer. The weight average molecular weight of the resultant polymer A5 was determined by GPC measurement in the same manner as in Example A1 and was found to be 30200 (as determined using polystyrene as a standard). Further, the solid content was determined by heating the product in a 150° C. oven for 2 hr and was found to be 40.1%.

Example A6

Synthesis of Polymer A6

A colorless transparent MMA polymer solution was synthesized in the same manner as in polymer A1, except that DEDG was used as the solvent and dibenzoyl peroxide ("NYPER BW" manufactured by Nippon Oils & Fats Co., Ltd.) was used as the radical polymerization initiator. The weight average molecular weight of the resultant polymer A6 was determined by GPC measurement in the same manner as in Example A1 and was found to be 29500 (as determined using polystyrene as a standard). Further, the solid content was determined by heating the product in a 150° C. oven for 2 hr and was found to be 40.5%.

Example A7

Synthesis of Polymer A7

A colorless transparent MMA polymer solution was synthesized in the same manner as in polymer A1, except that N,N-dimethylacetamide (hereinafter referred to as "DMAc") was used as the solvent and the dropwise addition amount of "PERBUTYL O" was changed to 3.20 parts by weight. The weight average molecular weight of the resultant polymer A7 was determined by GPC measurement in the same manner as in Example A1 and was found to be 29000 (as determined using polystyrene as a standard). Further, the solid content was determined by heating the product in a 150° C. oven for 2 hr and was found to be 39.3%.

Example A8

Synthesis of Polymer A8

A colorless transparent MMA polymer solution was synthesized in the same manner as in polymer A1, except that ethyl lactate was used as the solvent and the dropwise addition amount of "PERBUTYL O" was changed to 2.65 parts by weight. The weight average molecular weight of polymer A8 thus obtained was determined by GPC measurement in the same manner as in Example A1 and was found to be 30000 (as determined using polystyrene as a standard). Further, the solid content was determined by heating the product in a 150° C. oven for 2 hr and was found to be 39.8%.

Example A9

Synthesis of Polymer A9

A colorless transparent MMA polymer solution was synthesized in the same manner as in polymer A1, except that propylene glycol monomethyl ether acetate (hereinafter referred to as "PGMEA") was used as the solvent and the dropwise addition amount of "PERBUTYL O" was changed to 3.00 parts by weight. The weight average molecular weight of polymer A9 thus obtained was determined by GPC measurement in the same manner as in Example A1 and was found to be 30300 (as determined using polystyrene as a standard). Further, the solid content was determined by heating the product in a 150° C. oven for 2 hr and was found to be 39.5%.

Example A10

Synthesis of Polymer A10

A colorless transparent MMA polymer solution was synthesized in the same manner as in polymer A1, except that N-methyl-2-pyrrolidone (hereinafter referred to as "NMP") was used as the solvent and the dropwise addition amount of "PERBUTYL O" was changed to 4.00 parts by weight. The weight average molecular weight of polymer A10 thus obtained was determined by GPC measurement in the same manner as in Example A1 and was found to be 30300 (as determined using polystyrene as a standard). Further, the solid content was determined by heating the product in a 150° C. oven for 2 hr and was found to be 39.9%.

Example A11

Synthesis of polymer A11

A colorless transparent MMA polymer solution was synthesized in the same manner as in polymer A1, except that ε-caprolactone (hereinafter referred to as "ε-cap") was used as the solvent and the dropwise addition amount of "PERBUTYL O" was changed to 4.50 parts by weight. The weight average molecular weight of polymer A11 thus obtained was determined by GPC measurement in the same manner as in Example A1 and was found to be 29300 (as determined using polystyrene as a standard). Further, the solid content was determined by heating the product in a 150° C. oven for 2 hr and was found to be 42.4%.

Comparative Example A1

Synthesis of polymer A12

A colorless transparent MMA polymer solution was synthesized in the same manner as in polymer A1, except that toluene was used the solvent and the dropwise addition amount of "PERBUTYL O" was changed to 1.00 parts by weight.

The weight average molecular weight of polymer A12 thus obtained was determined by GPC measurement in the same manner as in Example A1 and was found to be 28400 (as determined using polystyrene as a standard). Further, the solid content was determined by heating the product in a 150° C. oven for 2 hr and was found to be 39.7%.

Comparative Example A2

Synthesis of Polymer A13

A colorless transparent MMA/BMA copolymer solution was synthesized in the same manner as in polymer A4, except that toluene was used as the solvent and the dropwise addition amount of "PERBUTYL O" was changed to 1.00 part by weight.

The weight average molecular weight of polymer A13 thus obtained was determined by GPC measurement in the same manner as in Example A1 and was found to be 29400 (as determined using polystyrene as a standard). Further, the solid content was determined by heating the product in a 150° C. oven for 2 hr and was found to be 39.5%.

Evaluation Test A

<Results of Mass Analysis>

Pyrolysis-gas Chromatograph Mass Spectrometer

Polymer A1 was analyzed with a pyrolysis-gas chromatograph mass spectrometer (pyrolysis part: "PY-2020D" manufactured by Frontier Laboratories Ltd., GC part: "6890" manufactured by Agilent Technologies, Inc., and MS part: "5973N" manufactured by Agilent Technologies, Inc.). As a result, a component having mass number m/z: 186 was detected. In this case, a sample obtained by purifying only a resin from a resin solution with hexane was used for the analysis.

This numeric value is in agreement with the mass number of a molecule formed by combining one molecule of MMA with γ-butyrolactone as the solvent.

Laser Ionization Time-of-flight Mass Spectrometer

Figure 2:
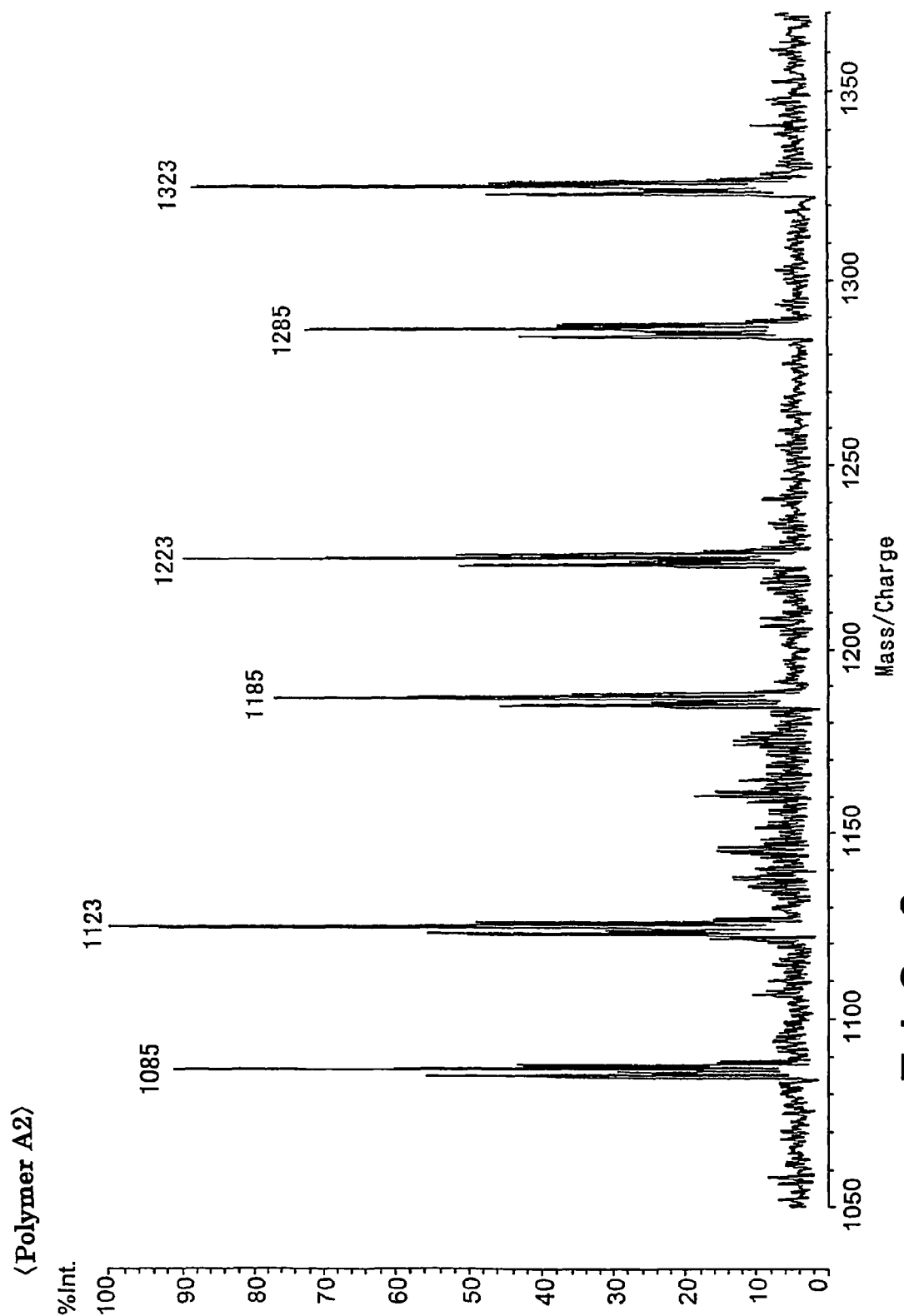
FIG. 2 is a diagram showing data on the measurement of polymer 2 produced in Example A2 with a laser ionization time-of-flight mass spectrometric analyzer.
Figure 3:
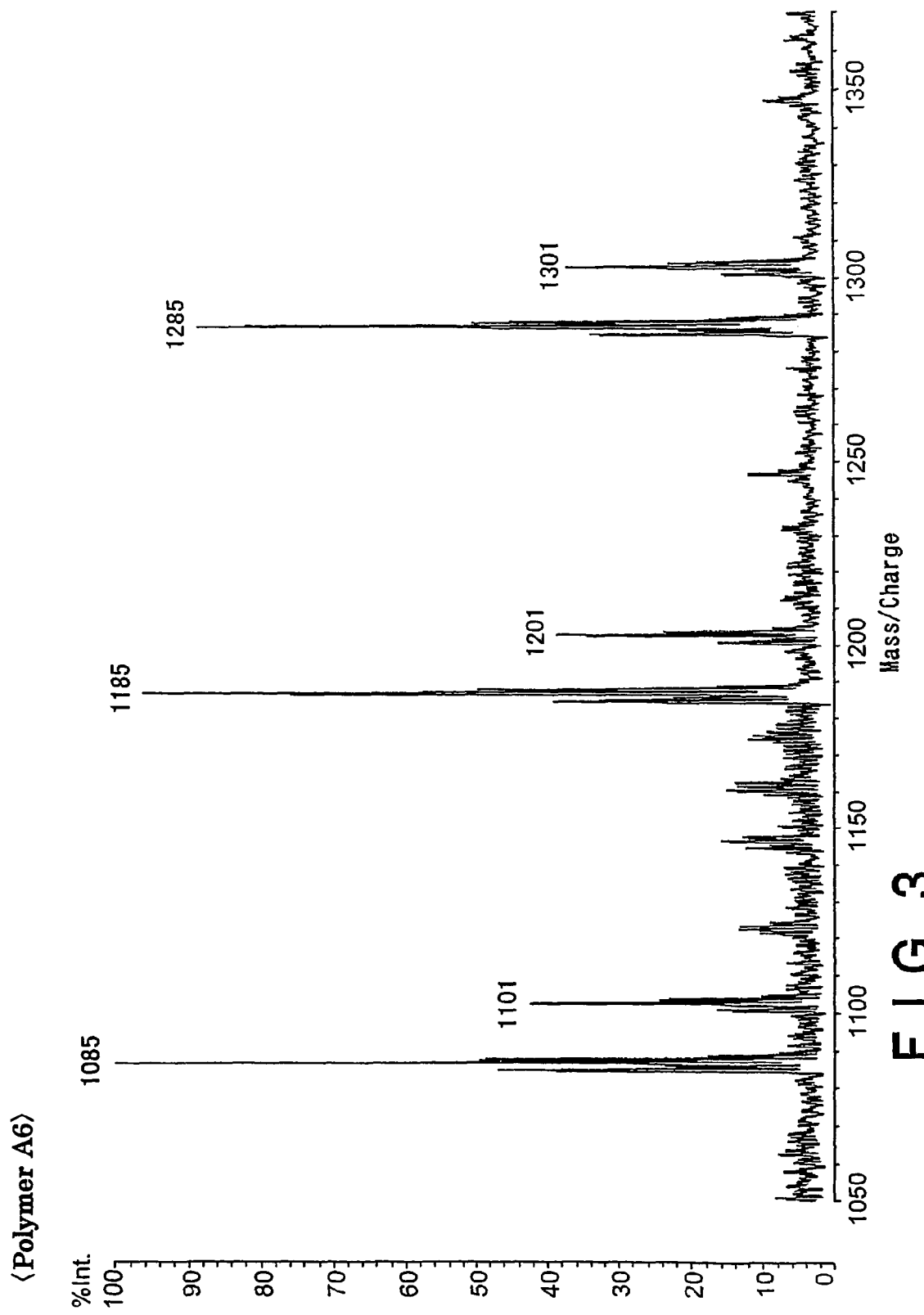
FIG. 3 is a diagram showing data on the measurement of polymer 6 produced in Example A6 with a laser ionization time-of-flight mass spectrometric analyzer.

For polymer A1, polymer A2, and polymer A6, the mass number was measured with MALDI TOF-MS (laser ionization time-of-flight mass spectrometer) (manufactured by Shimadzu Seisakusho Ltd., AXIMA-CFR plus, matrix; dithranol, cationization agent; NaI). As a result, the following results were obtained (FIGS. 1, 2 and 3).

A part of detected peaks will be summarized below.

Polymer A1 mass numbers 1109, 1123, 1209, 1223, 1309, and 1323

Polymer A2 mass numbers 1085, 1123, 1185, 1223, 1285, and 1323

Polymer A6 mass numbers 1085, 1101, 1185, 1201, 1285, and 1301

These values represent the mass of polymers ionized by $Na^+$.

Among these detected peaks, "1109, 1209, and 1309" for polymer A1 and "1085, 1185, and 1285" for polymer A2 and polymer A6 are in agreement with the mass number of Na ion of polymer having a solvent-derived structure at its end; "1123, 1223, and 1323" detected common to polymer A1 and polymer A2 are in agreement with the mass number of Na ion of polymer having at its end a heptyl group derived from t-butylperoxy-2-ethyl hexanoate as the radical polymerization initiator; and "1101, 1201, and 1301" detected for polymer A6 are in agreement with the mass number of Na ion of polymer having at its end a phenyl group derived from benzoyl peroxide as the radical polymerization initiator.

<Evaluation on Solubility>

Polymers A1 to A13 produced above were purified in hexane to remove the polymerization solvent, and the purified polymers were then dried in vacuo for 12 hr to give resin powders. The solubility of these resin powders in GBL, DEDG, BGAc, DMAc, ethyl lactate, PGMEA, NMP, and 6-cap was determined.

Evaluation Method

The resin powder (100 mg) was mixed with 5.0 g of the contemplated solvent in which the resin powder is to be dissolved. The mixture was stirred to measure the time necessary for the resin powder to be completely dissolved. The results were evaluated according to the following criteria. The evaluation results were as shown in Table 1 below.

TABLE 1

| Experimental Examples | Radical polymerizable monomer | Polymerization solvent | Radical polymerization initiator | Evaluation on solubility | | | | | | | |
|---|---|---|---|---|---|---|---|---|---|---|---|
| | | | | GBL | DEDG | BGAc | DMAc | Ethyl lactate | PGMEA | NMP | ε-Cap |
| Ex. A1 (polymer A1) | MMA 100 | GBL | a | A | — | — | — | — | — | — | — |
| Ex. A2 (polymer A2) | MMA 100 | DEDG | a | — | A | — | — | — | — | — | — |
| Ex. A3 (polymer A3) | MMA 100 | BGAc | a | — | — | B | — | — | — | — | — |
| Ex. A4 (polymer A4) | MMA/BMA = 90/10 | DEDG | a | — | A | — | — | — | — | — | — |
| Ex. A5 (polymer A5) | MMA/ETMA = 90/10 | DEDG | a | — | A | — | — | — | — | — | — |
| Ex. A6 (polymer A6) | MMA 100 | DEDG | b | — | A | — | — | — | — | — | — |
| Ex. A7 (polymer A7) | MMA 100 | DMAc | a | — | — | — | A | — | — | — | — |
| Ex. A8 (polymer A8) | MMA 100 | Ethyl lactate | a | — | — | — | — | A | — | — | — |
| Ex. A9 (polymer A9) | MMA 100 | PGMEA | a | — | — | — | — | — | A | — | — |
| Ex. A10 (polymer A10) | MMA 100 | NMP | a | — | — | — | — | — | — | A | — |
| Ex. A11 (polymer A11) | MMA 100 | ε-cap | a | — | — | — | — | — | — | — | A |
| Comp. Ex. A1 (polymer A12) | MMA 100 | Toluene | a | C | C | C | B | C | C | B | C |
| Comp. Ex. A2 (polymer A13) | MMA/BMA = 90/10 | Toluene | a | — | B | — | — | — | — | — | — |

A: Within 5 min
B: Within 10 min
C: 20 min or longer
Radical polymerization initiator
a: t-butylperoxy-2-ethyl hexanoate
b: dibenzoyl peroxide As is apparent from Table 1, the resins synthesized in toluene had a low level of solubility in GBL, DEDG, BGAc, DMAc, lactic ester, PGMEA, NMP, and ε-cap. On the other hand, the resins synthesized in respective solvents which are solvents in which the resins are contemplated to be dissolved, had an improved solubility in the respective contemplated solvents.

Second Aspect of the Invention

The second aspect of the present invention will be described in more detail with reference to the following Examples and Comparative Examples. However, it should be noted that the present invention is not limited to these Examples. In the following Example B or Comparative Example B, solvent-containing pigment dispersants were used after drying at 40° C. in vacuo for 12 hr. In the following description, the mixing amount of the pigment dispersant is expressed in terms of solid content of the dried material.

Example B1

Synthesis of Polymer B1

"Disperbyk-161" (manufactured by BYK-Chemie) (300 parts by weight) was placed in a four-necked flask equipped with a stirrer and a nitrogen introduction tube and was heated to 100° C. with a mantle heater. A mixed liquid composed of 180 parts by weight of MMA, 20 parts by weight of BMA, and 5.00 parts by weight of "PERBUTYL O" was added dropwise to the flask through a dropping funnel over a period of 1.5 hr. After the completion of the dropwise addition, 0.6 part by weight of "PERBUTYL O" was added, and a reaction was allowed to proceed for 3 hr while maintaining the temperature at 100° C. to give a brown MMA/BMA copolymer. After the completion of the reaction, the reaction solution was cooled, and the weight average molecular weight of the resultant polymer B1 was determined by gel permeation chromatography with a GPC measuring device ("HLC-8220GPC" manufactured by Tosoh Corporation) and was found to be 21000 (as determined using polystyrene as a standard).

Example B2

Synthesis of Polymer B2

A brown MMA/BzMA copolymer was synthesized in the same manner as in polymer B1, except that a mixture of 180 parts by weight of MMA with 20 parts by weight of benzyl methacrylate (BzMA; "ACRYESTER Bz" manufactured by Mitsubishi Rayon Co., Ltd.) was used as the radical polymerizable monomer to be added dropwise.

The weight average molecular weight of polymer B2 thus obtained was determined by GPC measurement in the same manner as in Example B1 and was found to be 20500 (as determined using polystyrene as a standard).

Example B3

Synthesis of Polymer B3

A light brown MMA/BMA copolymer was synthesized in the same manner as in polymer B1, except that "Ajisper PB822" (manufactured by Ajinomoto Fine-Techno. Co. Inc.) was used as the dispersant. The weight average molecular weight of polymer B3 thus obtained was determined by GPC measurement in the same manner as in Example B1 and was found to be 21500 (as determined using polystyrene as a standard).

Example B4

Synthesis of Polymer B4

A light brown MMA/BMA copolymer was synthesized in the same manner as in polymer B1, except that "Disperbyk-2001" (manufactured by BYK-Chemie) was used as the dispersant. The weight average molecular weight of polymer B4 thus obtained was determined by GPC measurement in the same manner as in Example B1 and was found to be 19500 (as determined using polystyrene as a standard).

Example B5

Synthesis of Polymer B5

A brown MMA/BMA copolymer was synthesized in the same manner as in polymer B1, except that "Solsperse 33500" (manufactured by The Lubrizol Corporation) was used as the dispersant. The weight average molecular weight of polymer B5 thus obtained was determined by GPC measurement in the same manner as in Example B1 and was found to be 20000 (as determined using polystyrene as a standard).

Example B6

Synthesis of Polymer B6

A brown MMA/BMA copolymer was synthesized in the same manner as in polymer B5, except that 5.00 parts by weight of dibenzoyl peroxide ("NYPER BW" manufactured by Nippon Oils & Fats Co., Ltd.) was used as the radical polymerization initiator used in the polymerization. The weight average molecular weight of polymer B6 thus obtained was determined by GPC measurement in the same manner as in Example B1 and was found to be 19000 (as determined using polystyrene as a standard).

Example B7

Synthesis of polymer B7

GBL (270 parts by weight) and 30 parts by weight of "Solsperse 33500" were placed in a four-necked flask equipped with a stirrer and a nitrogen introduction tube and were heated to 100° C. with a mantle heater. A mixed liquid composed of 200 parts by weight of MMA and 3.60 parts by weight of "PERBUTYL O" was added dropwise to the flask through a dropping funnel over a period of 1.5 hr. After the completion of the dropwise addition, 0.6 part by weight of "PERBUTYL O" was added, and a reaction was allowed to proceed for 3 hr while maintaining the temperature at 100° C. to give a brown MMA polymer solution. The weight average molecular weight of polymer B7 thus obtained was determined by GPC measurement in the same manner as in Example B1 and was found to be 29500 (as determined using polystyrene as a standard). Further, the solid content was determined by heating the product in a 150° C. oven for 2 hr and was found to be 45.6%.

Example B8

Synthesis of Polymer B8

A brown MMA/BMA copolymer solution was synthesized in the same manner as in polymer B8, except that DEDG was used as the solvent, a mixture of 190 parts by weight of MMA with 10 parts by weight of BMA was used as the radical polymerizable monomer to be added dropwise, and the dropwise addition amount of "PERBUTYL O" was changed to 2.40 parts by weight.

The weight average molecular weight of polymer B8 thus obtained was determined by GPC measurement in the same manner as in Example B1 and was found to be 29000 (as determined using polystyrene as a standard). Further, the solid content was determined by heating the product in a 150° C. oven for 2 hr and was found to be 45.8%.

Example B9

Synthesis of Polymer B9

A brown MMA/BMA copolymer solution was synthesized in the same manner as in polymer B8, except that "Disperbyk- 2001" was used as the dispersant and a mixture of 180 parts by weight of MMA with 20 parts by weight of BMA was used as the radical polymerizable monomer. The weight average molecular weight of polymer B9 thus obtained was determined by GPC measurement in the same manner as in Example B1 and was found to be 30000 (as determined using polystyrene as a standard). Further, the solid content was determined by heating the product in a 150° C. oven for 2 hr and was found to be 46.0%.

Example B10

Synthesis of Polymer B10

A brown MMA/BMA copolymer solution was synthesized in the same manner as in polymer B9, except that "Disperbyk-161" was used as the dispersant. The weight average molecular weight of polymer B10 thus obtained was determined by GPC measurement in the same manner as in Example B1 and was found to be 29100 (as determined using polystyrene as a standard). Further, the solid content was determined by heating the product in a 150° C. oven for 2 hr and was found to be 46.1%.

Example B11

Synthesis of Polymer B11

A light brown MMA/BMA copolymer solution was synthesized in the same manner as in polymer B9, except that "Ajisper PB822" was used as the dispersant. The weight average molecular weight of polymer B11 thus obtained was determined by GPC measurement in the same manner as in Example B1 and was found to be 30100 (as determined using polystyrene as a standard). Further, the solid content was determined by heating the product in a 150° C. oven for 2 hr and was found to be 45.9%.

Comparative Example B1

Synthesis of Polymer B12

Toluene (300 parts by weight) was placed in a four-necked flask equipped with a stirrer and a nitrogen introduction tube and was heated to 100° C. with a mantle heater. A mixed liquid composed of 180 parts by weight of MMA, 20 parts by weight of BMA, and 2.50 parts by weight of azobisisobutyronitrile (AIBN; manufactured by Wako Pure Chemical Industries, Ltd.) was added dropwise to the flask through a dropping funnel over a period of 1.5 hr. After the completion of the dropwise addition, 0.6 part by weight of AIBN was added, and a reaction was allowed to proceed for 3 hr while maintaining the temperature at 100° C. to give a colorless transparent MMA/BMA copolymer. After the completion of the reaction, the reaction solution was cooled, and the weight average molecular weight of polymer B12 thus obtained was determined by GPC measurement and was found to be 20300 (as determined using polystyrene as a standard). Further, the solid content was determined by heating the product in a 150° C. oven for 2 hr and was found to be 39.1%.

Comparative Example B2

Synthesis of Polymer B13

A colorless transparent MMA/BMA copolymer was synthesized in the same manner as in polymer B12, except that 2.50 parts by weight of "PERBUTYL O" was used as the radical polymerization initiator used in the polymerization. The weight average molecular weight of polymer B13 thus obtained was determined by GPC measurement in the same manner as in Example B1 and was found to be 19800 (as determined using polystyrene as a standard). Further, the solid content was determined by heating the product in a 150° C. oven for 2 hr and was found to be 38.9%.

Comparative Example B3

Synthesis of Polymer B14

A colorless transparent MMA/BzMA copolymer was synthesized in the same manner as in polymer B13, except that a mixture of 180 parts by weight of MMA with 20 parts by weight of BzMA was used as the radical polymerizable monomer to be added dropwise. The weight average molecular weight of polymer B14 thus obtained was determined by GPC measurement in the same manner as in Example B1 and was found to be 20100 (as determined using polystyrene as a standard). Further, the solid content was determined by heating the product in a 150° C. oven for 2 hr and was found to be 39.1%.

Comparative Example B4

Synthesis of Polymer B15

A colorless transparent MMA/BMA copolymer was synthesized in the same manner as in polymer B13, except that 5.20 parts by weight of "PERBUTYL O" was used as the radical polymerization initiator used in the polymerization. The weight average molecular weight of polymer B15 thus obtained was determined by GPC measurement in the same manner as in Example B1 and was found to be 10800 (as determined using polystyrene as a standard). Further, the solid content was determined by heating the product in a 150° C. oven for 2 hr and was found to be 38.8%.

Comparative Example B5

Synthesis of Polymer B16

DEDG (300 parts by weight) was placed in a four-necked flask equipped with a stirrer and a nitrogen introduction tube and was heated to 100° C. with a mantle heater. A mixed liquid composed of 180 parts by weight of MMA, 20 parts by weight of BMA, and 3.60 parts by weight of "PERBUTYL O" was added dropwise to the flask through a dropping funnel over a period of 1.5 hr. After the completion of the dropwise addition, 0.6 part by weight of "PERBUTYL O" was added, and a reaction was allowed to proceed for 3 hr while maintaining the temperature at 100° C. to give a colorless transparent MMA/BMA copolymer solution. After the completion of the reaction, the reaction solution was cooled, and the weight average molecular weight of polymer B16 thus obtained was determined by GPC measurement in the same manner as in Example B1 and was found to be 29800 (as determined using polystyrene as a standard). Further, the solid content was determined by heating the product in a 150° C. oven for 2 hr and was found to be 39.5%.

Comparative Example B6

Synthesis of Polymer B17

A colorless transparent MMA/BMA copolymer solution was synthesized in the same manner as in polymer B16, except that 10.00 parts by weight of "PERBUTYL O" was used as the radical polymerization initiator used in the polymerization.

The weight average molecular weight of polymer B17 thus obtained was determined by GPC measurement in the same manner as in Example B1 and was found to be 15000 (as determined using polystyrene as a standard). Further, the solid content was determined by heating the product in a 150° C. oven for 2 hr and was found to be 39.4%.

Evaluation Test B
<Evaluation on Compatibility>

Polymers B1 to B6 produced in Examples B1 to B6 were diluted with diluent solvents (for more detail, see Table 2) by a factor of three (weight ratio) to prepare evaluation samples. For the resin solutions of polymers B7 to B11 produced in Examples B7 to B11, evaluation samples were prepared by diluting these resin solutions with polymerization solvents to bring the solid content to 30%. On the other hand, for polymers B12 to B15 produced in Comparative Examples B1 to B4, evaluation samples were prepared by adding pigment dispersant (for more detail of "additive dispersant," see Table 4) in an amount of 1.5 times (weight ratio) the resin solid content and toluene in an amount of 3.5 times (weight ratio) the resin solid content. For polymers B16 and B17 produced in Comparative Examples B5 and B6, evaluation samples were prepared by mixing the polymers with 15% by weight, based on the resin solid content, of an additive dispersant and DEDG in an amount of 2.7 times (weight ratio) the resin solid content.

The compatibility of each evaluation sample was evaluated by filling and hermetically sealing the evaluation sample within 12 hr after the preparation thereof and, in this state, allowing the evaluation sample to stand at 25° C. to determine the number of days necessary for the dispersant and the acrylic resin to be separated from each other. The results were as shown in Tables 2 to 5. In the column of "Evaluation on compatibility," "A" means that separation was not observed even after the elapse of 30 days or longer, "B" means that separation was observed within 15 days, and "C" means that separation was observed within 7 days.

TABLE 2

| Experimental Examples | Monomer (wt %) | Dispersant | Type of dispersant | Polymerization initiator | Mw | Diluent solvent used in preparation of evaluation samples | Evaluation on compatibility |
|---|---|---|---|---|---|---|---|
| Ex. B1 (polymer B1) | MMA/BMA = 90/10 | Disperbyk 161 | I | Perbutyl O | 21000 | Toluene | A |
| Ex. B2 (polymer B2) | MMA/BzMA = 90/10 | Disperbyk 161 | I | Perbutyl O | 20500 | Toluene | A |
| Ex. B3 (polymer B3) | MMA/BMA = 90/10 | Ajisper PB822 | II | Perbutyl O | 21500 | Toluene | A |
| Ex. B4 (polymer B4) | MMA/BMA = 90/10 | Disperbyk 2001 | III | Perbutyl O | 19500 | Toluene | A |
| Ex. B5 (polymer B5) | MMA/BMA = 90/10 | Solsperse 33500 | II | Perbutyl O | 20000 | Toluene PGMEA DEDG | A |
| Ex. B6 (polymer B6) | MMA/BMA = 90/10 | Solsperse 33500 | II | NYPER BW | 19000 | Toluene | A |

Monomer: MMA: methyl methacrylate, BMA: butyl methacrylate, and BzMA: benzyl methacrylate
Type of dispersant: I: urethane dispersant, II: polyamine dispersant, and III: an A-B block copolymer and/or a B-A-B block copolymer comprising an A block having a quaternary ammonium base on its side chain and a B block not having a quaternary ammonium base on its side chain
Polymerization initiator: Perbutyl O: t-butylperoxy-2-ethyl hexanoate, and NYPER BW: dibenzoyl peroxide
Diluent solvent: PGMEA: propylene glycol monomethyl ether acetate, and DEDG: diethylene glycol diethyl ether
Evaluation on compatibility: A: not separated even after the elapse of 30 days or longer, B: separated within 15 days, and C: separated within 7 days

TABLE 3

| Experimental Examples | Monomer (wt %) | Polymerization solvent | Dispersant | Type of dispersant | Mw | Evaluation on compatibility |
|---|---|---|---|---|---|---|
| Ex. B7 (polymer B7) | MMA = 100 | GBL | Solsperse 33500 | II | 29500 | A |
| Ex. B8 (polymer B8) | MMA/BMA = 95/5 | DEDG | Solsperse 33500 | II | 29000 | A |
| Ex. B9 (polymer B9) | MMA/BMA = 90/10 | DEDG | Disperbyk 2001 | III | 30000 | A |
| Ex. B10 (polymer B10) | MMA/BMA = 90/10 | DEDG | Disperbyk 161 | I | 29100 | A |
| Ex. B11 (polymer B11) | MMA/BMA = 90/10 | DEDG | Ajisper PB822 | II | 30100 | A |

Monomer: MMA: methyl methacrylate, and BMA: butyl methacrylate
Polymerization solvent: GBL: γ-butyrolactone, and DEDG: diethylene glycol diethyl ether
Type of dispersant: I: urethane dispersant, II: polyamine dispersant, and III: an A-B block copolymer and/or a B-A-B block copolymer comprising an A block having a quaternary ammonium base on its side chain and a B block not having a quaternary ammonium base on its side chain
Evaluation on compatibility: A: not separated even after the elapse of 30 days or longer, B: separated within 15 days, and C: separated within 7 days

TABLE 4

| Experimental Examples | Monomer (wt %) | Polymerization solvent | Type of dispersant | Polymerization initiator | Mw | Additive dispersant | Type of additive dispersant | Evaluation on compatibility |
|---|---|---|---|---|---|---|---|---|
| Comp. Ex. B1 (polymer B12) | MMA/BMA = 90/10 | Toluene | None | AIBN | 20300 | Solsperse 33500 | II | C |
| Comp. Ex. B2 (polymer B13) | MMA/BMA = 90/10 | Toluene | None | Perbutyl O | 19800 | Disperbyk 161 | I | C |
| | | | | | | Ajisper PB822 | II | C |
| | | | | | | Disperbyk 2001 | III | C |
| Comp. Ex. B3 (polymer B14) | MMA/BzMA = 90/10 | Toluene | None | Perbutyl O | 20100 | Solsperse 33500 | II | C |
| Comp. Ex. B4 (polymer B15) | MMA/BMA = 90/10 | Toluene | None | Perbutyl O | 10800 | Solsperse 33500 | II | B |

Monomer: MMA: methyl methacrylate, BMA: butyl methacrylate, and BzMA: benzyl methacrylate
Polymerization initiator: AIBN: azobisisobutyronitrile, and Perbutyl O: t-butylperoxy-2-ethyl hexanoate
Type of additive dispersant: I: urethane dispersant, II: polyamine dispersant, and III: an A-B block copolymer and/or a B-A-B block copolymer comprising an A block having a quaternary ammonium base on its side chain and a B block not having a quaternary ammonium base on its side chain
Evaluation on compatibility: A: not separated even after the elapse of 30 days or longer, B: separated within 15 days, and C: separated within 7 days

TABLE 5

| Experimental Examples | Monomer (wt %) | Polymerization solvent | Dispersant | Polymerization initiator | Mw | Additive dispersant | Type of additive dispersant | Evaluation on compatibility |
|---|---|---|---|---|---|---|---|---|
| Comp. Ex. B5 (polymer B16) | MMA/BMA = 90/10 | DEDG | None | Perbutyl O | 29800 | Solsperse 33500 | II | C |
| | | | | | | Disperbyk 2001 | III | C |
| | | | | | | Disperbyk 161 | I | C |
| | | | | | | Ajisper PB822 | II | C |
| Comp. Ex. B6 (polymer B17) | MMA/BMA = 90/10 | DEDG | None | Perbutyl O | 15000 | Solsperse 33500 | II | B |

Monomer: MMA: methyl methacrylate, and BMA: butyl methacrylate
Polymerization initiator: Perbutyl O: t-butylperoxy-2-ethyl hexanoate
Type of additive dispersant: I: urethane dispersant, II: polyamine dispersant, and III: an A-B block copolymer and/or a B-A-B block copolymer comprising an A block having a quaternary ammonium base on its side chain and a B block not having a quaternary ammonium base on its side chain
Evaluation on compatibility: A: not separated even after the elapse of 30 days or longer, B: separated within 15 days, and C: separated within 7 days

The invention claimed is:

1. A process for producing a polymer composition, comprising polymer (A) represented by formula (A):

(A)

wherein S represents a solvent-derived component; $(M)_p$ represents a polymer moiety comprising a radical polymerizable monomer unit M; and p is any integer, the process comprising polymerizing a radical polymerizable monomer in a solvent containing a compound represented by formula (1) or (2) in the presence of a radical polymerization initiator:

[Chemical formula 1]

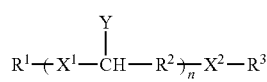

formula (1)

formula (2)

wherein $R^1$ and $R^3$ each independently represent hydrogen or a monovalent hydrocarbon group; $R^2$ and $R^4$ each independently represent a divalent hydrocarbon group, provided that $R^2$ optionally represents nil; Y represents hydrogen, a monovalent hydrocarbon group or a hydroxyalkyl group; m is an integer of zero (0) or 1; n is an integer of 1 to 10; and $X^1$ and $X^2$ each independently represent any of the following divalent substituents:

[Chemical formula 2]

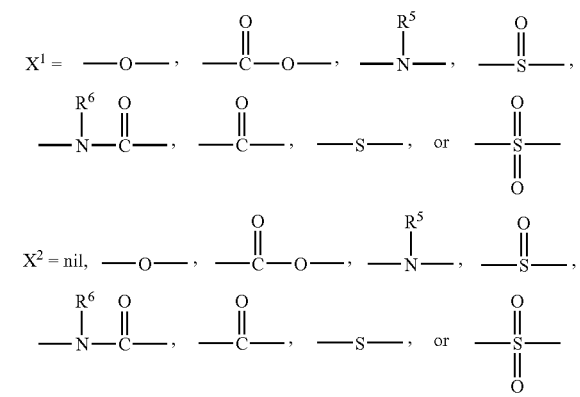

wherein $R^5$ and $R^6$ each independently represent hydrogen, a monovalent hydrocarbon group or a hydroxyalkyl group, and wherein the radical polymerizable monomer is at least one monomer selected from the group consisting of
(i) styrene,
(ii) α-, o-, m-, p-alkyl, nitro, cyano, amide, and ester derivatives of styrene,
(iii) (meth)acrylic acid, methyl (meth)acrylate, ethyl (meth)acrylate, n-propyl (meth)acrylate, iso-propyl (meth)acrylate, n-butyl (meth)acrylate, sec-butyl (meth)acrylate, iso-butyl (meth)acrylate, tert-butyl (meth)acrylate, pentyl (meth)acrylate, neopentyl (meth)acrylate, hexyl (meth)acrylate, 2-ethylhexyl (meth)acrylate, octyl (meth)acrylate, iso-octyl (meth)acrylate, nonyl (meth)acrylate, iso-nonyl (meth)acrylate, dodecyl (meth)acrylate, tridecyl (meth)acrylate, stearyl (meth)acrylate, cyclopentyl (meth)acrylate, cyclohexyl (meth)acrylate, 2-methyl cyclohexyl (meth)acrylate, dicyclopentanyl (meth)acrylate, dicyclopentenyloxyethyl (meth)acrylate, dicyclohexyl (meth)acrylate, isobornyl (meth)acrylate, adamantyl (meth)acrylate, allyl (meth)acrylate, propargyl (meth)acrylate, phenyl (meth)acrylate, naphthyl (meth)acrylate, anthracenyl (meth)acrylate, anthranonyl (meth)acrylate, piperonyl (meth)acrylate, salicyl (meth)acrylate, furyl (meth)acrylate, furfuryl (meth)acrylate, tetrahydrofuryl (meth)acrylate, tetrahydrofurfuryl (meth)acrylate, pyranyl (meth)acrylate, benzyl (meth)acrylate, phenethyl (meth)acrylate, cresyl (meth)acrylate, glycidyl (meth)acrylate, glycidyl ether 4-hydroxybutyl (meth)acrylate, 3,4-epoxycyclohexylmethyl (meth)acrylate, 3,4-epoxycyclohexylethyl (meth)acrylate, 1,1,1-trifluoroethyl (meth)acrylate, perfluoroethyl (meth)acrylate, perfluoro-n-propyl (meth)acrylate, perfluoro-iso-propyl (meth)acrylate, heptadecafluorodecyl (meth)acrylate, triphenylmethyl (meth)acrylate, cumyl (meth)acrylate, 3-(N,N-dimethylamino)propyl (meth)acrylate, 2-hydroxyethyl (meth)acrylate, 2-hydroxypropyl (meth)acrylate, 2,3-dihydroxypropyl (meth)acrylate, 4-hydroxybutyl (meth)acrylate, glycerol (meth)acrylate, methoxyethyl (meth)acrylate, ethoxyethyl (meth)acrylate, butoxyethyl (meth)acrylate, 2-cyanoethyl (meth)acrylate, dimethylaminoethyl (meth)acrylate, diethylaminoethyl (meth)acrylate, trimethoxysilylpropyl (meth)acrylate, triethoxysilylpropyl (meth)acrylate, 3-methacryloxypropylmethyldiethoxysilane, and 3-methacryloxypropylmethyldimethoxysilane,
(iv) (meth)acrylic acid amide, (meth)acrylic acid N,N-dimethylamide, (meth)acrylic acid N,N-diethylamide, (meth)acrylic acid N,N-dipropylamide, (meth)acrylic acid N,N-di-iso-propylamide, (meth)acrylic acid butylamide, (meth)acrylic acid stearylamide, (meth)acrylic acid cyclohexylamide, (meth)acrylic acid phenylamide, (meth)acrylic acid benzylamide, and (meth)acrylic acid anthracenylamide,
(v) (meth)acrylic acid anilide, (meth)acryloyInitrile, acrolein, vinyl chloride, vinylidene chloride, vinyl fluoride, vinylidene fluoride, N-vinylpyrrolidone, vinylpyridine, N-vinylcarbazole, vinylimidazole, and vinyl acetate,
(vi) N-benzylmaleimide, N-phenylmaleimide, N-cyclohexylmaleimide, N-laurinmaleimide, and N-(4-hydroxyphenyl)maleimide, and
(vii) N-(meth)acryloylphthalimide.

2. The process for producing a polymer composition according to claim 1, wherein $R^1$ and $R^3$ represent hydrogen or an alkyl group having 1 to 6 carbon atoms, $R^2$ and $R^4$ represent an alkylene group having 1 to 6 carbon atoms, Y represents hydrogen, an alkyl group having 1 to 6 carbon atoms, or a hydroxyalkyl group having 1 to 6 carbon atoms, n is 1 to 6, and $R^5$ and $R^6$ represent hydrogen, an alkyl group having 1 to 6 carbon atoms, or a hydroxyalkyl group having 1 to 6 carbon atoms.

3. The process for producing a polymer composition according to claim 1 or 2, wherein the radical polymerization initiator is one or at least two organic peroxides selected from hydroperoxides, dialkyl peroxides, peroxyesters, diacyl peroxides, peroxycarbonates, peroxyketals, and ketone peroxides.

4. A process for producing a polymer composition, comprising polymerizing a radical polymerizable monomer in a pigment dispersant or a pigment dispersant-containing solution in the presence of a radical polymerization initiator.

5. The process for producing a polymer composition according to claim 4, wherein the pigment dispersant is a urethane dispersant in which a hydrogen atom is attached to a carbon atom adjacent to —O—, —COO—, —$NR^7$—, —$NR^8$CO— or $NR^9$COO—, wherein $R^7$, $R^8$, and $R^9$ each independently represent hydrogen, a monovalent hydrocarbon group having 1 to 20 carbon atoms, or a monovalent hydroxyalkyl group having 1 to 20 carbon atoms, a polyamine dispersant, or an A-B block copolymer of an A block having a quaternary ammonium base on its side chain with a B block not having a quaternary ammonium base on its side chain, and/or a B-A-B block copolymer.

6. The process for producing a polymer composition according to claim 4 or 5, wherein the radical polymerization initiator is one or at least two organic peroxides selected from hydroperoxides, dialkyl peroxides, peroxyesters, diacyl peroxides, peroxycarbonates, peroxyketals, and ketone peroxides.

7. The process for producing a polymer composition according to claim 4 or 5, wherein a compound represented by formula (1) or (2) is used as a solvent:

[Chemical formula 4]

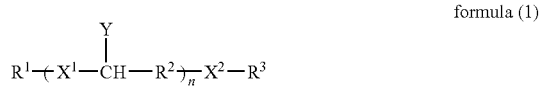

formula (1)

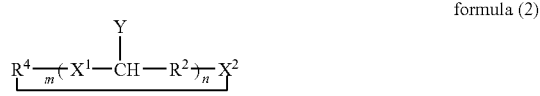

formula (2)

wherein $R^1$ and $R^3$ each independently represent hydrogen or a monovalent hydrocarbon group; $R^2$ and $R^4$ each independently represent a divalent hydrocarbon group, provided that $R^2$ optionally represents nil; Y represents hydrogen, a monovalent hydrocarbon group or a hydroxyalkyl group; m is an integer of zero (0) or 1; n is an integer of 1 to 10; and $X^1$ and $X^2$ each independently represent any of the following divalent substituents:

[Chemical formula 5]
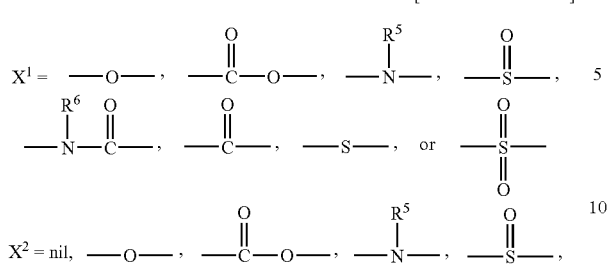
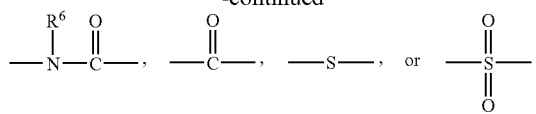
wherein $R^5$ and $R^6$ each independently represent hydrogen, a monovalent hydrocarbon group or a hydroxyalkyl group.
* * * * *